US011807109B2

(12) United States Patent
Kim et al.

(10) Patent No.: US 11,807,109 B2
(45) Date of Patent: Nov. 7, 2023

(54) POWER CONTROL APPARATUS AND METHOD FOR AUTONOMOUS VEHICLE

(71) Applicants: HYUNDAI MOTOR COMPANY, Seoul (KR); KIA CORPORATION, Seoul (KR)

(72) Inventors: Sae Rom Kim, Seoul (KR); Soon Myung Kwon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 166 days.

(21) Appl. No.: 17/321,861

(22) Filed: May 17, 2021

(65) Prior Publication Data

US 2022/0063414 A1 Mar. 3, 2022

(30) Foreign Application Priority Data

Aug. 26, 2020 (KR) ........................ 10-2020-0107945

(51) Int. Cl.
*H02J 9/06* (2006.01)
*B60R 16/03* (2006.01)
*B60L 3/00* (2019.01)

(52) U.S. Cl.
CPC ............ *B60L 3/0092* (2013.01); *B60R 16/03* (2013.01); *H02J 9/061* (2013.01); *H02J 9/068* (2020.01); *H02J 2310/48* (2020.01)

(58) Field of Classification Search
CPC ........ B60L 3/0092; B60L 1/00; B60L 3/0084; B60L 58/20; B60R 16/03; B60R 16/0232; B60R 16/033; B60R 16/005; B60R 16/023; H02J 9/061; H02J 9/068; H02J 2310/48; H02J 2310/46; H02J 1/086; Y02T 10/70; B60T 17/18; H02M 3/158; H02M 3/00; B60W 60/0023; B60W 50/02; B60W 2050/0002; B60W 2050/021; B60Y 2306/15
See application file for complete search history.

(56) References Cited

U.S. PATENT DOCUMENTS

2003/0029654 A1* 2/2003 Shimane .................. B60K 6/28 903/917
2013/0020863 A1* 1/2013 Sugiyama .............. B60L 58/20 320/134

(Continued)

*Primary Examiner* — Lincoln D Donovan
*Assistant Examiner* — Alex W Lam
(74) *Attorney, Agent, or Firm* — MORGAN, LEWIS & BOCKIUS LLP

(57) ABSTRACT

A power control apparatus includes: a first power supply device that supplies main power, a second power supply device that supplies auxiliary power, a power divider that divides the main power input from the first power supplier, a first controller connected to a first output terminal of the power divider to control power supply to a first in-vehicle load by connecting or disconnecting the main power and the auxiliary power, and a second controller connected to a second output terminal of the power divider to control power supply to a second in-vehicle load using the main power. The first controller and the second controller diagnose a power failure in cooperation with each other and supply redundancy power using the main power or the auxiliary power based on a power failure diagnosis result.

20 Claims, 19 Drawing Sheets

(56) References Cited

U.S. PATENT DOCUMENTS

2015/0217660 A1* 8/2015 Manabe .................. H02M 7/44
307/23
2016/0229411 A1* 8/2016 Murata ................... B60L 58/12
2018/0123152 A1* 5/2018 Matsumoto ....... H01M 8/04223

* cited by examiner

POWER CONTROL APPARATUS AND METHOD FOR AUTONOMOUS VEHICLE

CROSS-REFERENCE TO RELATED APPLICATION

This application claims the benefit of priority to Korean Patent Application No. 10-2020-0107945, filed in the Korean Intellectual Property Office on Aug. 26, 2020 in the Korean Intellectual Property Office, the entire contents of which are incorporated herein by reference.

TECHNICAL FIELD

The present disclosure relates a power control apparatus and method for an autonomous vehicle.

BACKGROUND

In general, when an unexpected situation occurs during driving, a driver of a vehicle determines the situation and controls at least one of a steering function or a braking function to stop the vehicle in a vehicle system. In an autonomous vehicle system, an electronic control unit (ECU) is an entity that controls a vehicle's driving (behavior). When a power failure such as a short circuit or an open line occurs during autonomous driving, there is a possibility that the vehicle is inoperable because the autonomous vehicle system is reset due to the low voltage of the entire vehicle. To solve this problem, in the autonomous vehicle system, redundancy technology is implemented in a way to duplicate the ECU and a power supply device that perform accident avoidance and/or emergency stop to ensure the safety of occupants in the event of an emergency.

In addition, information and communication technologies have been further developed for autonomous vehicles, for example, by providing a 12V power source of a battery or a low voltage dc/dc converter (LDC) to supply separate redundancy power to major systems related to autonomous driving such as steering and braking, so as to implement power in the event of a breakdown while driving. In the case of implementing redundancy in this manner, there is however a problem that wiring is largely changed in a vehicle being mass-produced and a cost significantly increases as dual power sources are newly provided to the vehicle.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides a power control apparatus and method for an autonomous vehicle in which dual power sources that supply power to main loads for autonomous driving are provided to provide stable power to the main loads for autonomous driving in the case of a power failure during the autonomous driving of a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a power control apparatus includes: a first power supply device that supplies main power, a second power supply device that supplies auxiliary power, a power divider that is connected to the first power supply device and divides the main power supply from the first power supply device, a first controller connected to a first output terminal of the power divider to control power supply to in-vehicle loads by connecting or disconnecting the main power and the auxiliary power, and a second controller connected to a second output terminal of the power divider to control power supply to the in-vehicle loads using the main power, wherein the first controller and the second controller diagnose a power failure in cooperation with each other and supply redundancy power selectively using the main power and the auxiliary power based on a power failure diagnosis result.

The first power supply device may include a low voltage dc/dc converter that converts high voltage power supplied from a high voltage battery to low voltage power, and the second power supply device may include an auxiliary battery that supplies the low voltage power.

The first controller may include a communication circuit that performs communication with the second controller, a first switch that monitors the main power and the auxiliary power between the first power supply device and the second power supply device and supplies or cuts off at least one of the main power or the auxiliary power according to a monitoring result, a second switch that supplies or cuts off power to the in-vehicle loads, and a processor that diagnoses a power failure in cooperation with the first controller and controls at least one of the first switch or the second switch based on a diagnosis result.

The first controller further may include a current determination circuit that detects at least one overcurrent in at least one of a main power input terminal, an auxiliary power input terminal or a load power output terminal, and a current cut-off circuit that cuts off an overcurrent-detected portion when the overcurrent is detected.

The first controller may disconnect and cut off the main power from the first controller when a main power failure is detected, and supply power to the in-vehicle loads using the auxiliary power when identifying a main power output failure of the first power supply device in cooperation with the second controller.

The first controller may transmit a message notifying a power failure to the second controller when identifying a main power output failure of the power divider, and the second controller may supply power to the in-vehicle loads using the main power in an independent manner from the first controller.

The first controller may monitor a state of a current input from the second power supply device, and when the auxiliary power failure is detected, the first controller cuts off the auxiliary power to maintain the main power supply.

The second controller may supply power to at least one of the in-vehicle loads in which a power output failure of the first controller is detected using the main power when the power output failure of the first controller to at least one of the in-vehicle loads is detected.

The first controller may supply power to at least one of the in-vehicle loads in which a power output failure of the second controller is detected using the auxiliary power when the power output failure of the second controller to the at least one of the in-vehicle loads is detected.

Each of the in-vehicle loads may include at least one of a steering device, a braking device, an autonomous driving device, an airbag device, a cluster device, a lighting device, a door device, or a communication device.

According to an aspect of the present disclosure, a power control method may include diagnosing, by a first controller and a second controller in cooperation with each other, a power failure, and suppling, by the first controller and the second controller, redundancy power to in-vehicle loads, respectively, selectively using main power from a first power supply device and auxiliary power from a second power supply device based on a power failure diagnosis result.

The diagnosing of the power failure may include monitoring, by the first controller, a state of the main power and a state of the auxiliary power outputted from the first power supply device and the second power supply device, respectively, determining, by the first controller, whether the power failure is present on a main power input side or an auxiliary power input side in response to detecting the power failure, upon determining that the power failure is present on the auxiliary power input side, determining, by the first controller, an auxiliary power input failure, and upon determining that the power failure is not present, determining, by the first controller, a load power output failure of the first controller.

The supplying of the redundancy power may include cutting off, by the first controller, an input of the auxiliary power upon determining the auxiliary power input failure, and maintaining, by the second controller, supply of power to the in-vehicle loads using the main power upon detecting the auxiliary power input failure through the first controller.

The supplying of the redundancy power may include cutting off, by the first controller, a load power output using the auxiliary power upon determining the a load power output failure of the first controller, and in response to detecting the load power output failure of the first controller through the first controller, supplying, by the second controller, power to at least one of the in-vehicle loads to which power supply by the first controller is cut off using the main power.

The diagnosing of the power failure may include when a main power failure of the first controller is detected by the first controller, determining, by the second controller, the main power input failure based on a main power input state of the second controller, when the main power input failure is not detected, determining, by the second controller, a first controller power output failure of a power divider arranged between the first power supply device and the first controller based on the main power input state of the first controller by communicating with the first controller, when the main power input of the first controller is normal, determining, by the second controller, a load power output failure of the second controller based on whether it is possible to supply load power of the second controller, and upon determining that it is possible to supply the load power, determining, by the second controller, a high current load power output failure of the power divider.

The supplying of the redundancy power may include upon determining the main power input failure, cutting off, by the second controller, the main power input, and supplying, by the first controller, power to the in-vehicle loads using the auxiliary power.

The supplying of the redundancy power may include cutting off, by the first controller, the main power input in response to determining a power output failure of the power divider to the first controller and supplying, by the first controller and the second controller, power to the in-vehicle loads in an independent manner.

The supplying of the redundancy power may include upon determining the load power output failure of the second controller, cutting off, by the second controller, power supply to at least one of the in-vehicle loads, and supplying, by the first controller, power to at least one of the in-vehicle loads in which the power supply by the second controller is cut off.

The diagnosing of the power failure may include monitoring a current state of input power and output power of the first controller and the second controller and immediately cutting off at least one of the input power or the output power in response to detecting an overcurrent.

Each of the in-vehicle loads may include at least one of a steering device, a braking device, an autonomous driving device, an airbag device, a cluster device, a lighting device, a door device, or a communication device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
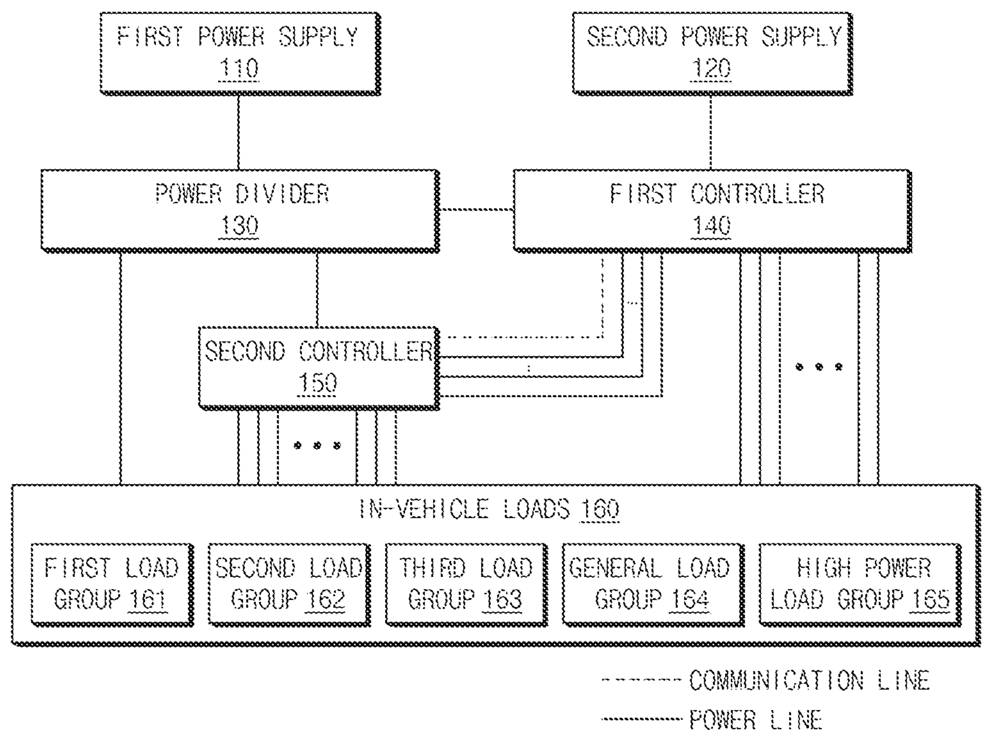
FIG. 1 is a block diagram showing a power control apparatus for an autonomous vehicle according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, “A”, “B”, (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure proposes a power redundancy technology that stabilizes power to allow a vehicle to be evacuated to safety zones (e.g., shoulders and/or service centers), before an autonomous driving system is reset and inoperable due to low voltage of the entire vehicle, when a power failure such as a short circuit and/or an open line occurs while an autonomous vehicle is driving.

The power redundancy system proposed herein may be configured to include dual power sources in such a way to change wiring paths of a low voltage dc/dc converter and a 12V battery (i.e., auxiliary battery) and add a switch controller that supplies or cuts off power to minimize the amount of change in the existing vehicle system. In addition, the power redundancy technology may implemented in such a way to separately supply main power and auxiliary power to main loads for autonomous driving and detect failures such as short circuits by monitoring the output of power and controlling cutting-off/disconnection of a power supply.

Herein, redundancy driving may refer to driving for emergency stop in a safe place when a power failure such as a short circuit occurs during autonomous driving, and redundancy power may refer to power supplied to the main loads for autonomous driving when a power failure occurs.

Figure 2:
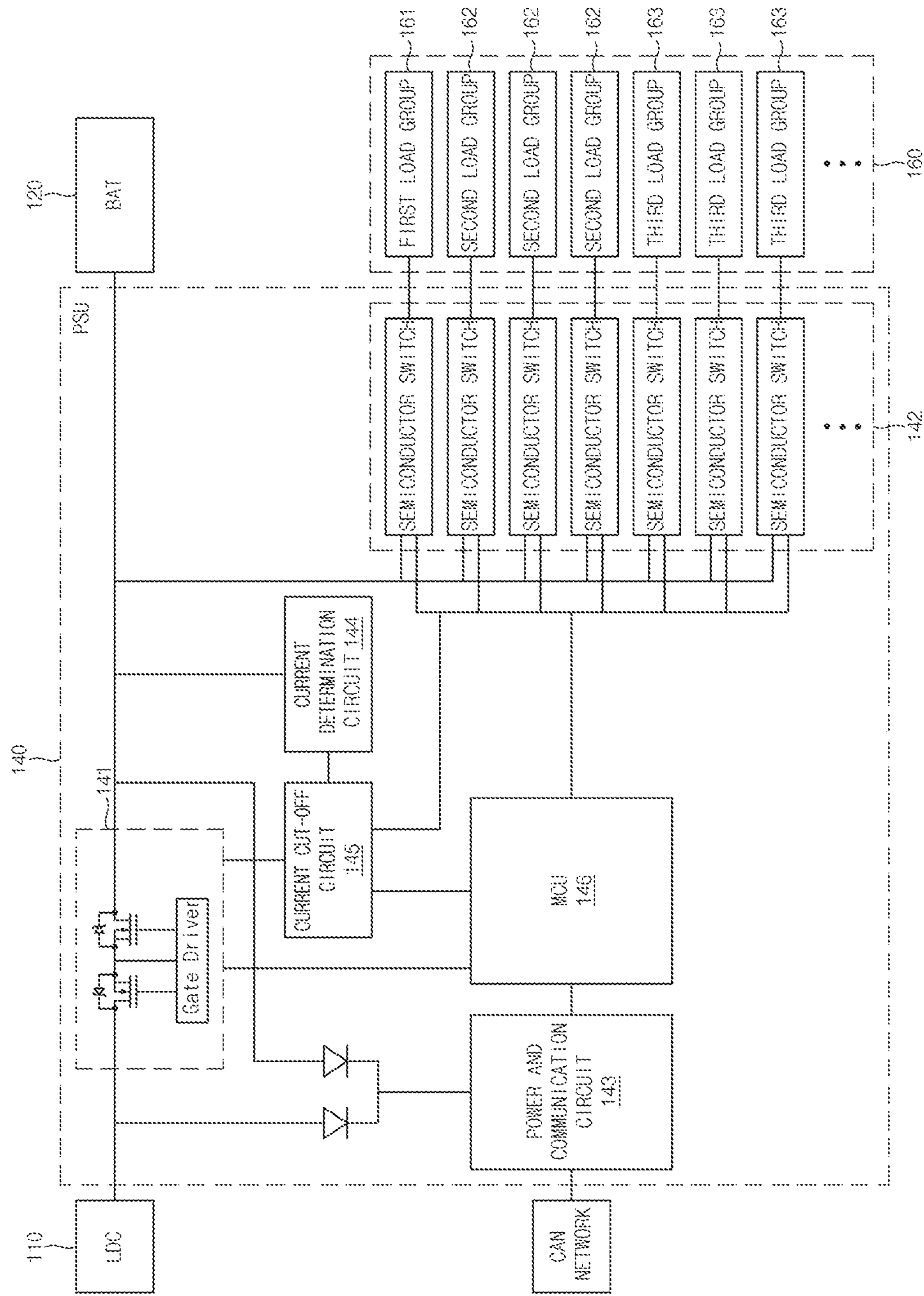
FIG. 2 shows a configuration diagram of a first controller shown in FIG. 1.

FIG. 1 is a block diagram showing a power control apparatus for an autonomous vehicle according to embodiments of the present disclosure, and FIG. 2 shows a configuration diagram of a first controller shown in FIG. 1.

A power control apparatus may be mounted on a vehicle capable of autonomous driving to supply or cut off power to a load (in-vehicle load) mounted in the vehicle. In addition, the power control apparatus may detect a power failure and perform a fail safety operation. Here, the vehicle may be an electrification vehicle such as an electric vehicle (EV) and/or a hybrid electric vehicle (HEV).

Referring to FIG. 1, the power control apparatus may include a first power supply 110, a second power supply 120, a power divider 130, a first controller 140, a second controller 150, and in-vehicle loads 160.

The first power supply 110 may be a device that supplies main power. The first power supply 110 may include a low voltage DC/DC converter (LDC) that converts high voltage power output from a high voltage battery (not shown) into low voltage power. Here, the high voltage battery (not shown) may supply power required for driving the vehicle. Here, the high voltage may refer to electric potential large enough to cause injury or damage. For example, the high voltage is any voltage difference between conductors that is higher than 1000 VAC or 1500 V ripple-free DC. The low voltage may refer to a voltage, e.g., in the range 50 to 1000 V ac or 120 to 1500 V dc in IEC Standard Voltages.

The second power supply 120 may be a device that supplies auxiliary power. The second power supply 120 may include an auxiliary battery (e.g., a low voltage battery or a 12V battery) used as redundancy power. Lithium-ion batteries or lead-acid batteries may be used as auxiliary batteries. To shorten a power stabilization time in a situation where redundancy driving is necessary and secure the SOC (State Of Charge) of the auxiliary battery as much as possible, a faulty power supply may be immediately disconnected and the auxiliary battery may be used to supply power only to a load for maintaining the minimum function of the vehicle.

The power divider 130 may be located in a powertrain electrics (PE) room of the vehicle and may be electrically connected to an output terminal of the first power supply 110. The power divider 130 may distribute the main power output (supplied) from the first power supply 110 to the first controller 140, the second controller 150, and/or a large power load among the in-vehicle loads 160. The power divider 130 may include a fuse and/or a relay.

The first controller 140 may be a power-net safety control unit (PSU) and may be connected to a first output terminal of the power divider 130. The first controller 140 may merge (connect) or separate (cut off) the output power (main power) of the first power supply 110 and the output power (auxiliary power) of the second power supply 120. The first controller 140 may monitor power output of the first power supply 110 and power output of the second power supply 120, determine a failure state of the power supply, and perform connection or disconnection control. When the power supply is recovered from the failure, the first controller 140 may connect power that has been cut off. The first controller 140 may disconnect a normal power supply before a situation in which vehicle control is impossible occurs due to a low voltage of the entire vehicle and initialization of an autonomous driving system because of a concentrated current caused by a power failure during autonomous driving.

The first controller 140 may monitor states of output power of the first power supply 110, output power of the second power supply 120, and main load power for autonomous driving. In other words, the first controller 140 may monitor states of a main power input side, an auxiliary power input side, and a load power output side. The first controller 140 may comprehensively determine a power state by measuring voltage, current, and temperature information. A criterion for determining a power state may be applied differently according to rated current requirements required by the vehicle for each vehicle type and/or for each option. In the case of a power failure, the first controller 140 may determine a cause of the power failure and a failed part to cut off power to the corresponding failed part.

In the case of a power failure, the first controller 140 may secure the SOC of the auxiliary battery as much as possible through rapid power separation, thereby maintaining redundancy driving performance and supporting emergency stopping. The first controller 140 may supply normal power to a main load for autonomous driving after power is disconnected in a situation where dual power control as well as redundancy are required.

Referring to FIG. 2, the first controller 140 may include a first power control switch 141, a second power control switch 142, a power and communication circuit 143, a current determination circuit 144, a current cut-off circuit 145, and a processor 146.

The first power control switch 141 may always supply high power between the first power supply 110 and the second power supply 120. The first power control switch 141 may connect or separate main power and auxiliary power. The first power control switch 141 may include at least one metal oxide semiconductor field effect transistor (MOSFET) that performs power on or off and a gate driver that controls voltage (or current) applied to a gate of each MOSFET may be included. As a MOSFET, a bidirectional MOSFET (Metal Oxide Semiconductor Field Effect Transistor) may be applied to cut off the inflow of back electromotive force through a body diode inside a semiconductor when either the main power or the auxiliary power is cut off. The MOSFET may cut off a power supply in which a failure has occurred when the output of dual power supplies, that is, the first power supply 110 and the second power supply 120 are monitored and the failure occurs in any one of two power supplies. It may be configured in the form of a bidirectional N-channel MOSFET such that it does not affect other power supply when a faulty power supply is cut off. The gate driver may collectively control the gate power of at least one bidirectional MOSFET.

The second power control switch 142 may supply (switch on) or cut off (switch off) power to main loads (e.g., steering load, braking load, loads related to implementing of autonomous driving functions, or the like) for autonomous driving such that an autonomous driving function is maintained for redundancy driving in an emergency stop situation. The second power control switch 142 may include a semiconductor switch connected to each of the in-vehicle loads 160. Here, an IPS (Intelligent Power Switch) and/or a MOSFET (including a gate driver) may be applied as the semiconductor switch.

The power and communication circuit 143 may supply power to the processor 146, and perform support such that the first controller 140 performs communication with other devices in the vehicle (e.g., sensors, electronic control units (ECUs) and/or the second controller 150). As communication technology, for example, a Controller Area Network (CAN), a Media Oriented Systems Transport (MOST) network, a Local Interconnect Network (LIN), and/or an X-by-Wire (Flexray) may be used.

The current determination circuit 144 may detect (determine) whether an overcurrent greater than or equal to a predetermined reference current occurs at the input side of the main power or the auxiliary power. The current cut-off circuit 145 may cut off the overcurrent by separating (cutting off) the main power and the auxiliary power when the overcurrent is detected by the current determination circuit 144. The current cut-off circuit 145 may cut off power within 1 ms as soon as the overcurrent is detected regardless of the determination of the processor 146. Accordingly, it is possible to prevent delay of the overcurrent cut-off due to the determination and retry of the power state of the processor 146.

The processor 146 may control the overall operation of the first controller 140. The processor 146 may be implemented with at least one of an application specific integrated circuit (ASIC), a digital signal processor (DSP), a programmable logic device (PLD), field programmable gate array (FPGAs), a central processing unit (CPU), microcontrollers (MCUs), or microprocessors. The memory (not shown) may be a non-transitory storage medium that stores instructions to be executed by the processor 146. The memory (not shown) may be implemented with at least one of storage media, such as a flash memory, a hard disk, an SD card (Secure Digital Card), a random access memory (RAM), a static random access memory (SRAM), a read only memory (ROM), a Programmable Read Only Memory (PROM), an Electrically Erasable and Programmable ROM (EEPROM), a Erasable and Programmable ROM (EPROM), a register and/or the like.

The processor 146 may connect or cut off the dual power supply by determining the cause of the failure and the failed part based on a predetermined failure determination criterion. When the current cut-off circuit 145 controls a gate driver to cut off an overcurrent, the processor 146 may diagnose (re-identify) a power failure by performing failure determination logic previously stored in a memory (not shown).

The processor 146 may share power failure information (a power failure diagnosis result) with the second controller 150 using the power and communication circuit 143. The processor 146 may control the first power control switch 141 based on the power failure diagnosis result to cut off the input of the main power or the auxiliary power. The processor 146 may cut off power output to the in-vehicle loads 160 by controlling the second power control switch 142 based on the power failure diagnosis result.

The second controller 150 may be an integrated central control unit (ICU) and may be connected to a second output terminal of the power divider 130 and connected to a certain output terminal of the first controller 140. The second controller 150 may include a communication circuit that performs communication with the first controller 140, a processor that controls the overall operation of the second controller 150, and a memory that stores instructions to be executed by the processor.

The second controller 150 may diagnose (detect) a power failure in cooperation with the first controller 140. The second controller 150 may supply or cut off power to the in-vehicle loads 160 according to the power failure diagnosis result.

The in-vehicle loads 160 may include at least one electronic loads mounted on the vehicle. The in-vehicle loads 160 may include a first load group 161, a second load group 162, a third load group 163, a general load group 164, a high-power load group 165 (e.g., a drive motor), and the like. Here, the first load group 161, the second load group 162, and the third load group 163 may be collectively referred to as redundancy loads. The redundancy loads may refer to main loads for autonomous driving, which need to maintain a stable power supply state and are essential in a redundancy driving situation. The redundancy load may include devices capable of maintaining a predetermined function even in the event of a power failure by connecting a dual power supply (redundancy power supply). In addition, the redundancy loads may be devices that perform similar functions (e.g., a braking device, a lighting device and/or a door device), and may maintain a predetermined function even in the case of a failure by supplying different power. The redundancy loads may be changed according to requirements for fail safety operation of an autonomous driving system for each vehicle type and/or for each option.

The first load group 161 may be a steering device and may include a Motor Driven Power Steering (MDPS) or the like. The MDPS may receive 50% of rated power as main power and the remaining 50% thereof as auxiliary power. The steering device may maintain its function with 50% reduction in performance in a redundancy driving situation.

The second load group 162 may be a braking load and may include an integrated electric brake (IEB), a redundancy control unit (RCU), an electric park brake (EPB) and/or the like. The IEB may perform four-wheel hydraulic control. In a redundancy driving situation, the RCU may perform front-wheel hydraulic control, and the EPB may control a rear wheel caliper.

The third load group 163 may include Advanced Driver Assistance Systems (ADAS), lighting devices (e.g., lamps), door unlock devices, Airbag Control Units (ACU), clusters (CLU), autonomous driving ECUs, communication devices (e.g., gateway), and the like. The autonomous driving ECU (autonomous driving device) may receive 100% power even in a redundancy driving situation (emergency situation) to avoid accidents and induce a safe stop based on determination on a driving situation. The ACU (airbag control unit) may need to be powered to deploy an airbag when an accident occurs during an emergency stop. The CLU (cluster) may need to be powered for notification of an emergency stop condition to a driver. The lighting device may need to maintain its function to maintain a forward recognition rate and share the vehicle's abnormal state with nearby vehicles and pedestrians. The door unlocking device may need to be powered to help the driver escape after an emergency stop. The communication device may need to be powered to perform the vehicle's gateway function.

Figure 3:
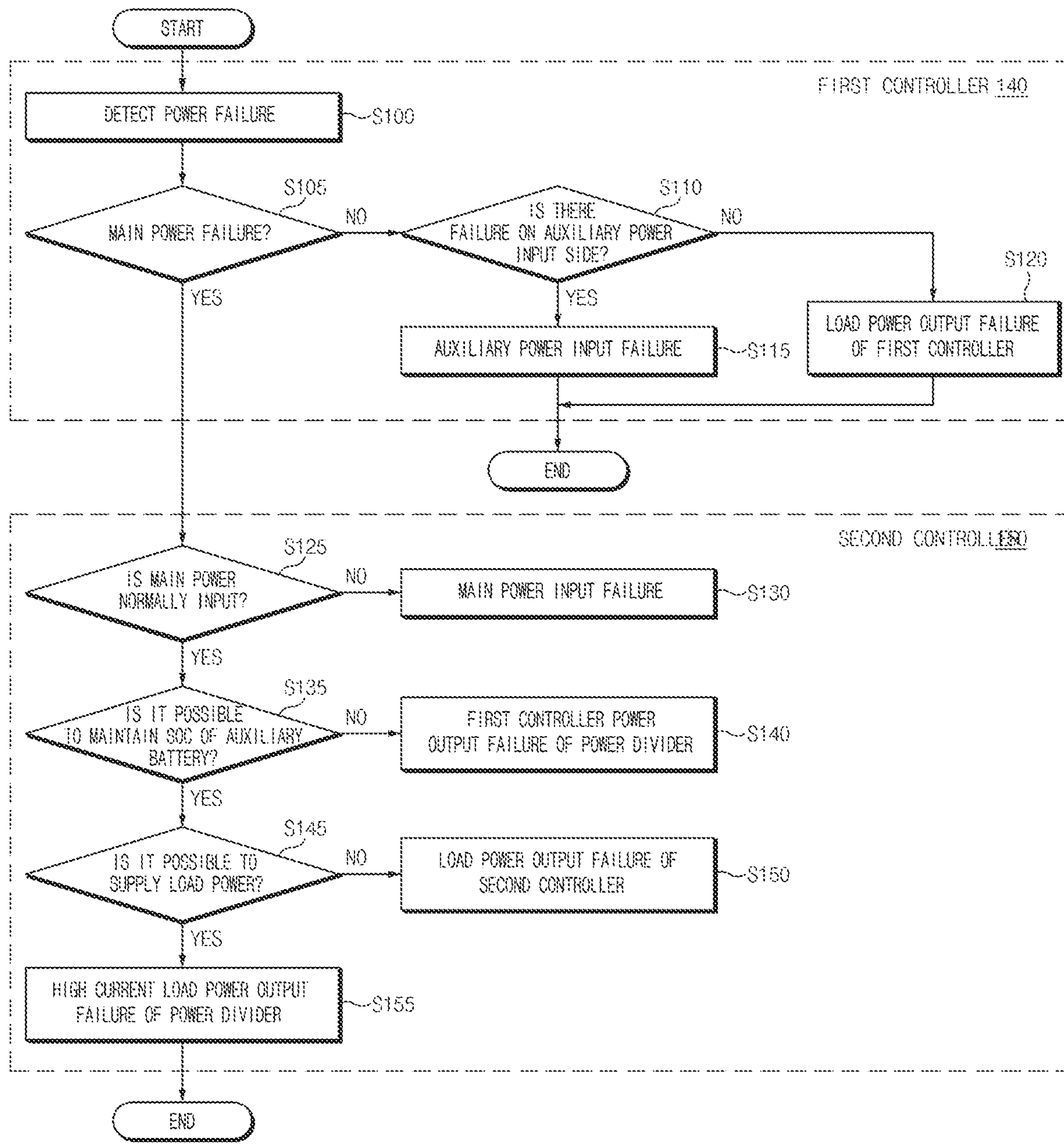
FIG. 3 is a flowchart showing a method of diagnosing a power failure according to embodiments of the present disclosure.

FIG. 3 is a flowchart showing a method of diagnosing a power failure according to embodiments of the present disclosure;

The first controller 140 may detect a power failure (S100). The current cut-off circuit 145 of the first controller 140 may cut off an overcurrent when the overcurrent equal to or greater than a predetermined reference current (threshold current) is detected through the current determination circuit 144.

When a power failure is detected, the first controller 140 may determine whether a main power failure has occurred (S105). The first controller 140 may determine whether the main power supplied from the first power supply 110 has failed. The main power output from the first power supply 110 may be supplied to various controllers (ECUs) in the vehicle, and supplied in the direction of charging an auxiliary battery (e.g., a 12V battery) of the second power supply 120. Therefore, the first controller 140 may determine a failure of the main power or auxiliary power by using a current flow. For example, the first power control switch 141 of the first controller 140 may determine a main power failure when a current flow is "−" and an auxiliary power failure when a current flow is "+". The first power control switch 141 may transmit a power failure diagnosis signal (e.g., a failure code) to the processor 146.

When it is not the main power failure, the first controller 140 may determine whether there is a failure at an auxiliary power input side (S110). In the case of a failure of the auxiliary power, the first controller 140 may determine whether a failure of the second power supply 120, that is, the auxiliary battery side has occurred.

In the case of a failure on the auxiliary power input side, the first controller 140 may determine an auxiliary power input failure (S115). In other words, the first controller 140 may diagnose an auxiliary power input failure when a failure of the second power supply 120 side has occurred.

The first controller 140 may determine (diagnose) a failure at a load power output of the first controller 140 when it is not a failure on the auxiliary power input side (S120).

In the case of the main power failure in S105, the first controller 140 may transmit a message (a failure diagnosis result) informing the main power failure to the second controller 150 by using the power and communication circuit 143.

The second controller 150 may identify whether the input of the main power is normal (S125). The second controller 150 may monitor a current and/or voltage of the main power which is output from the first power supply 110 and is then input to the second controller 150 through the power divider 130 and diagnose a state of the main power.

When the input of the main power is abnormal, the second controller 150 may determine a main power input failure (S130). The second controller 150 may determine the main power input failure in the case of a failure on the side of the first power supply 110.

When the input of the main power is normal in S125, the second controller 150 may identify whether an SOC of the auxiliary battery is able to be maintained above a predetermined level (S135). The second controller 150 may identify whether charging of the auxiliary battery using the main power is being maintained through communication with the first controller 140. The second controller 150 may determine that the SOC of the auxiliary battery is able to be maintained when the auxiliary battery is being charged, and may determine that the SOC of the auxiliary battery is not able to be maintained when the auxiliary battery is not being charged.

When it is determined in S135 that the SOC of the auxiliary battery is not able to be maintained, the second controller 150 may determine (diagnose) a power output failure with respect to the first controller 140 of the power divider 130 (S140). The second controller 150 may determine that a failure has occurred in a power line between the power divider 130 and the first controller 140.

When it is determined in S135 that the SOC of the auxiliary battery is able to be maintained, the second controller 150 may identify whether it is possible to supply power to a load (S145). The second controller 150 may identify whether it is possible to supply power to the in-vehicle load 160 connected to an output terminal of the second controller 150.

When it is hard to supply power to a load, the second controller 150 may determine a failure of the load power output of the second controller 150 (S150).

When it is possible to supply power to a load, the second controller 150 may determine a failure of the high current load power output of the power divider 130 (S155).

Figure 4:
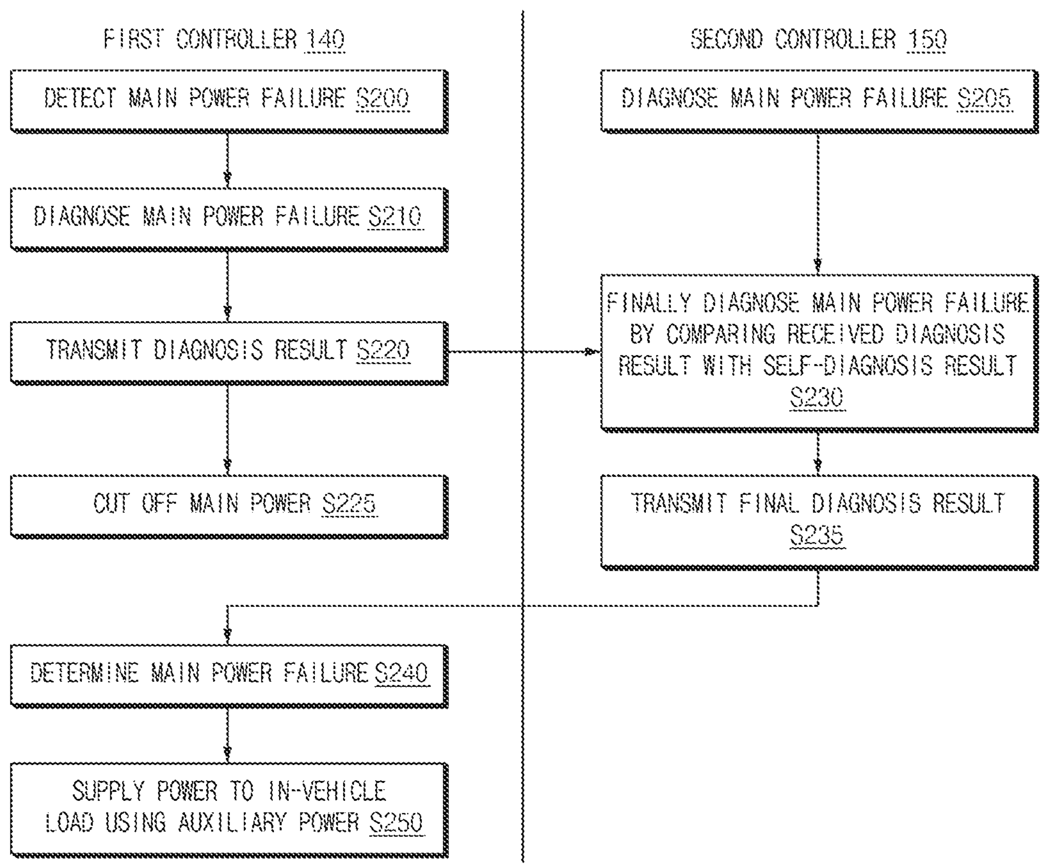
FIG. 4 is a flowchart showing a power control method according to a first embodiment of the present disclosure.
Figure 5:
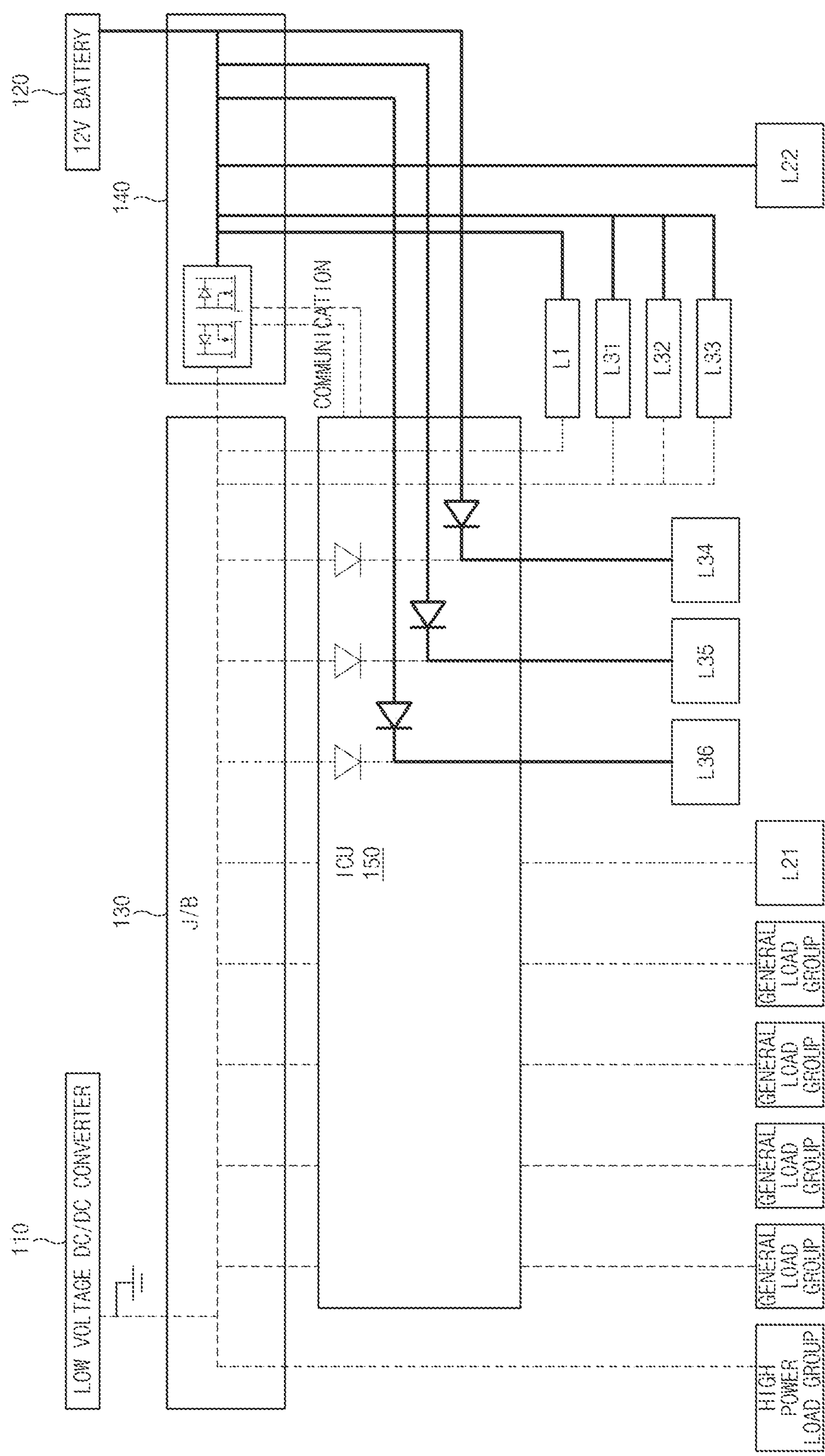
FIG. 5 shows an example of power control according to a first embodiment of the present disclosure.

FIG. 4 is a flowchart showing a power control method according to a first embodiment of the present disclosure. FIG. 5 shows an example of power control according to a first embodiment of the present disclosure;

Referring to FIG. 4, the first controller 140 may detect a main power failure (S200). The first controller 140 may monitor a current state of a main power input terminal using the current determination circuit 144, and determine that a main power failure occurs when a current input to a main power input terminal is an overcurrent of more than a reference current (e.g., 300 A). When the overcurrent is detected, the first controller 140 may immediately cut off the input of the main power using the current cut-off circuit 145.

The second controller 150 itself may diagnose (detect) a main power failure (S205). The second controller 150 may maintain a function of the second controller 150 by using auxiliary power supplied from the first controller 140. The second controller 150 may determine a state of power input through a power input pin of the processor 146. For example, the second controller 150 may determine that the main power is abnormal and the auxiliary power is normal.

When the main power failure is detected, the first controller 140 may diagnose (re-identify) the main power failure again (S210). The first controller 140 may re-identify an average value (Root Mean Square, RMS) of a current input to the main power input terminal for a predetermined time (e.g., 1 ms). When the re-identified current average value is equal to or greater than a reference current, the first controller 140 may determine that a short circuit failure of the main power is present.

The first controller 140 may transmit a main power failure diagnosis result to the second controller 150 (S220).

The second controller 150 may finally diagnose the main power failure by comparing the main power failure diagnosis result received from the first controller 140 with a result of failure diagnosis performed by itself (S230).

The second controller 150 may transmit the final diagnosis result to the first controller 140 (S235). The second controller 150 may transmit a message instructing to turn on a warning lamp indicating a main power failure to a lighting device. In addition, the second controller 150 may periodically monitor a state of the auxiliary power or enter a sleep mode.

The first controller 140 may determine the main power failure based on the final diagnosis result received from the second controller 150 (S240). The first controller 140 may receive a main power failure determination message from the second controller 150.

The first controller 140 may supply power to the in-vehicle loads 160 using the auxiliary power (S250). Referring to FIG. 5, the first controller 140 may supply 50% of rated power to a first load group L1 (e.g., MDPS), and supply 100% of rated power to a second load group L22 (e.g., RCU and EPB) and third load groups L311 to L33 (e.g., ACU and CLU), using the auxiliary power supplied from the second power supply 120. In addition, the first controller 140 may supply partial power to third load groups L34 to L36, for example, a lighting (lamp) device and a door device. In addition, the first controller 140 may support stopping at a safety zone (e.g., a shoulder) in an emergency situation.

Thereafter, when a faulty power is restored, the second controller 150 may identify that a main power warning lamp is turned off through deletion of a vehicle trouble code (DTC). The second controller 150 may transmit a message indicating that the main power warning lamp is turned off to the first controller 140. Further, the second controller 150 may identify restoration of main power by checking a main power input pin, and when receiving a message notifying that the main power is normal from the first controller 140, determine main power recovery. When the restoration of the main power is determined, the second controller 150 may transmit a message notifying the restoration of the main power to the first controller 140.

When the first controller 140 receives a message notifying that the main power warning lamp is turned off from the second controller 150, the first controller 140 may connect the main power and the auxiliary power and determine a state of the main power. The first controller 140 may transmit a result of determining the state of the main power to the second controller 150.

Figure 6:
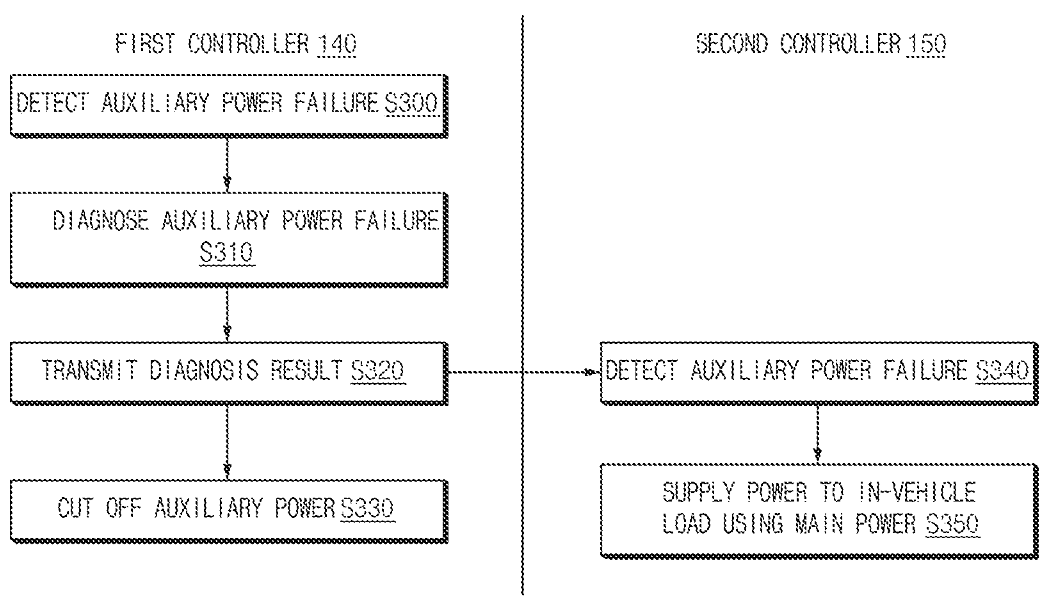
FIG. 6 is a flowchart showing a power control method according to a second embodiment of the present disclosure.
Figure 7:
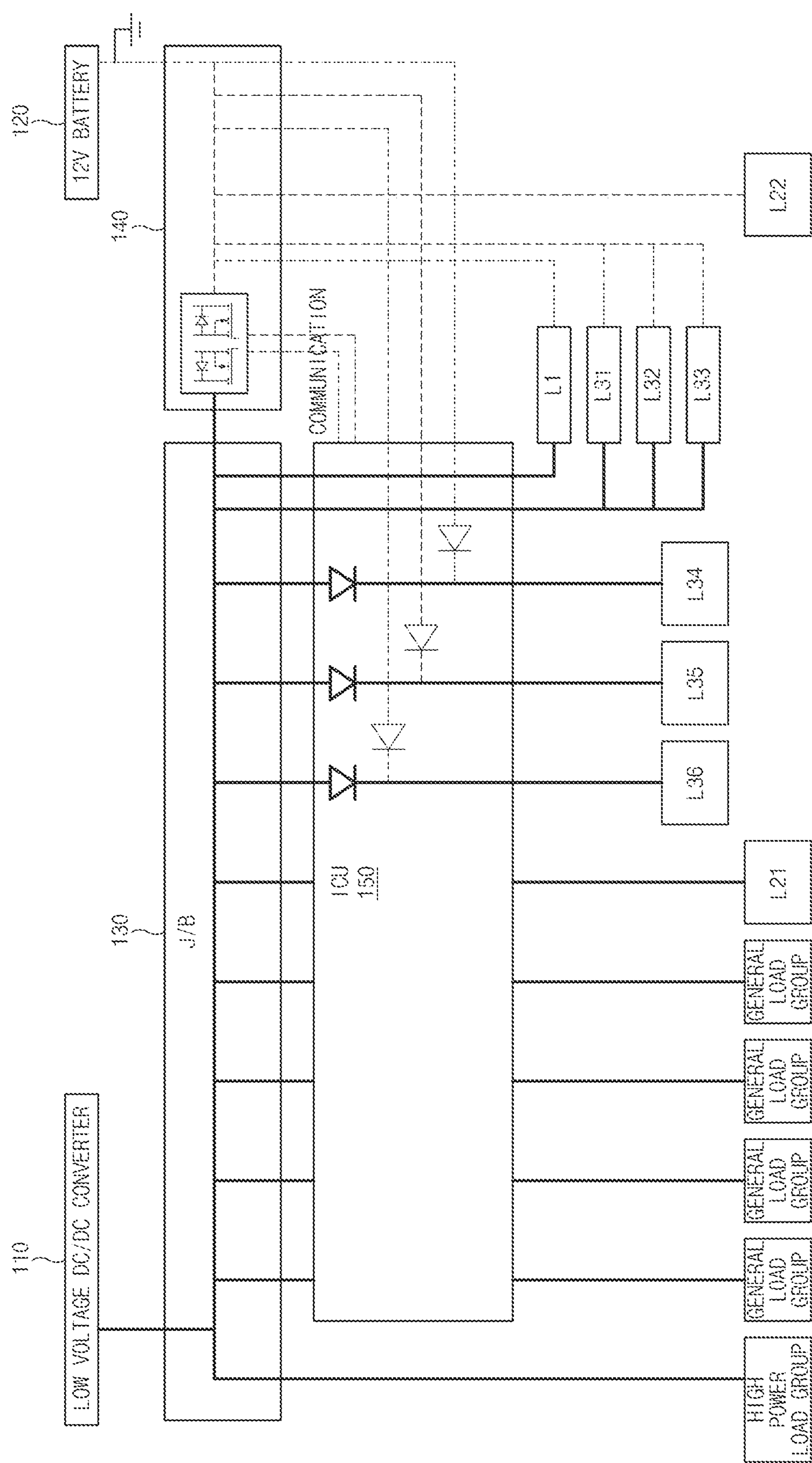
FIG. 7 shows an example of power control according to a second embodiment of the present disclosure.

FIG. 6 is a flowchart showing a power control method according to a second embodiment of the present disclosure. FIG. 7 shows an example of power control according to a second embodiment of the present disclosure.

The first controller 140 may detect an auxiliary power failure (S300). The first controller 140 may monitor a current state of an auxiliary power input terminal and determine that an auxiliary power failure is present when an overcurrent is detected at the auxiliary power input terminal. When the overcurrent is detected at the auxiliary power input terminal, the first controller 140 may immediately cut off the auxiliary power input terminal using the current cut-off circuit 145.

When the auxiliary power failure is detected, the first controller 140 may diagnose the auxiliary power failure (S310). The first controller 140 may re-identify an average current value of the auxiliary power input terminal for a predetermined time. The first controller 140 may determine whether a power output of an auxiliary battery has failed by comparing the re-identified average current value with input power input to the processor 146.

The first controller 140 may transmit an auxiliary power failure diagnosis result to the second controller 150 (S320). When a power output failure of the auxiliary battery is determined, the first controller 140 may transmit a message indicating an auxiliary power input failure to the second controller 150.

When the power output failure of the auxiliary battery is determined, the first controller 140 may cut off the auxiliary power (S330). The first controller 140 may disconnect and cut off the auxiliary battery.

The second controller 150 may detect an auxiliary power failure based on a failure diagnosis result transmitted from the first controller 140 (S340). When the second controller 150 receives a message indicating the determination of a power output failure of the auxiliary power from the first controller 140, the second controller 150 may identify the auxiliary power failure.

The second controller 150 may supply power to the in-vehicle loads 160 using the main power (S350). Referring to FIG. 7, the second controller 150 may supply 50% of rated power to the first load group L1 and the second load group L21 using the main power, and supply 100% of the rated power to the third load groups L31 to L36. In addition, the second controller 150 may support normal operation by supplying power to most of the loads connected to the second controller 150 after turning on an auxiliary battery failure warning lamp.

Thereafter, when the auxiliary power is restored, the second controller 150 may transmit a message notifying that the warning lamp is turned off to the first controller 140 when it is determined that the warning lamp is turned off, through the deletion of a trouble code. The first controller 140 may wake-up after receiving a message notifying that the warning lamp is turned off to reconnect the auxiliary battery. When the auxiliary battery is reconnected, the first controller 140 may identify a state of an output power of the auxiliary battery to determine whether the auxiliary power is normal. The first controller 140 may transmit a message notifying that the auxiliary power is normal to the second controller 150, and the second controller 150 may determine restoration of the auxiliary power based on the received message. The second controller 150 may transmit a message indicating determination of restoration of the auxiliary power to the first controller 140. The first controller 140 may sequentially supply power to the in-vehicle loads 160 connected to the first controller 140 when receiving the message indicating determination of restoration of the auxiliary power. The first controller 140 may charge the auxiliary battery using the main power.

Figure 8:
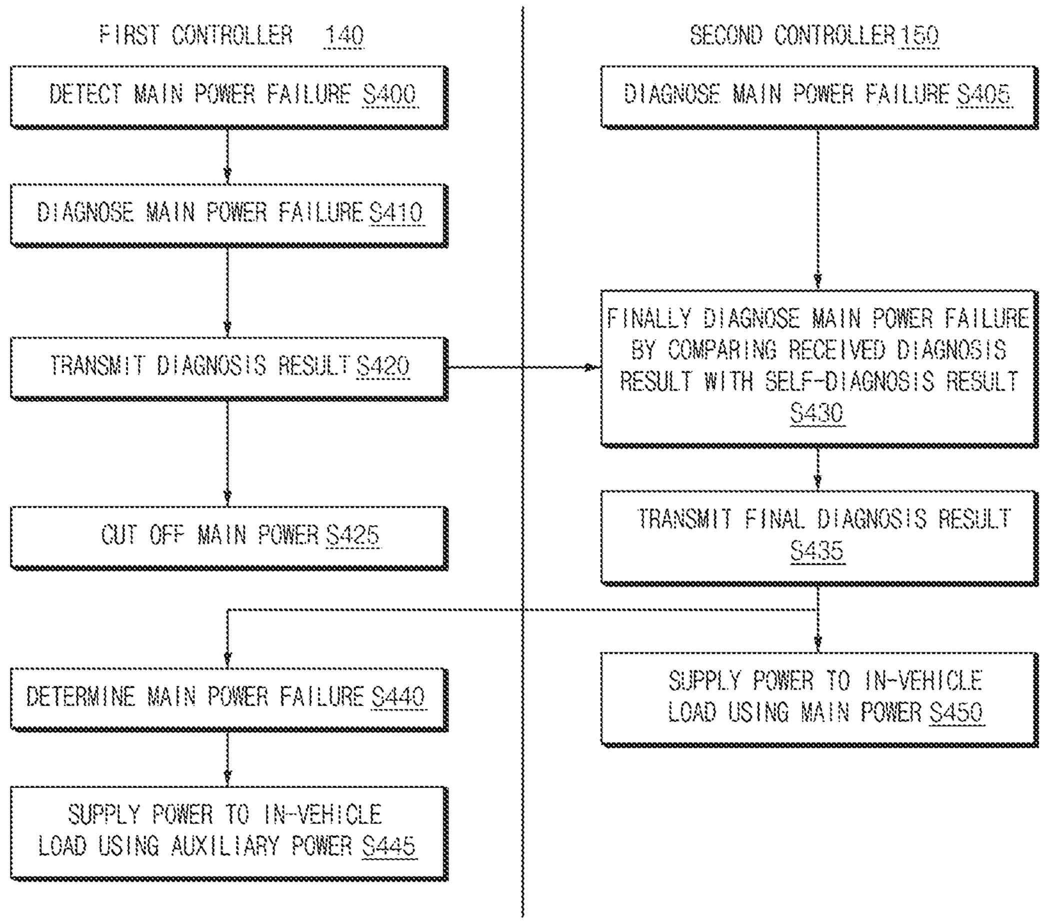
FIG. 8 is a flowchart showing a power control method according to a third embodiment of the present disclosure.
Figure 10:
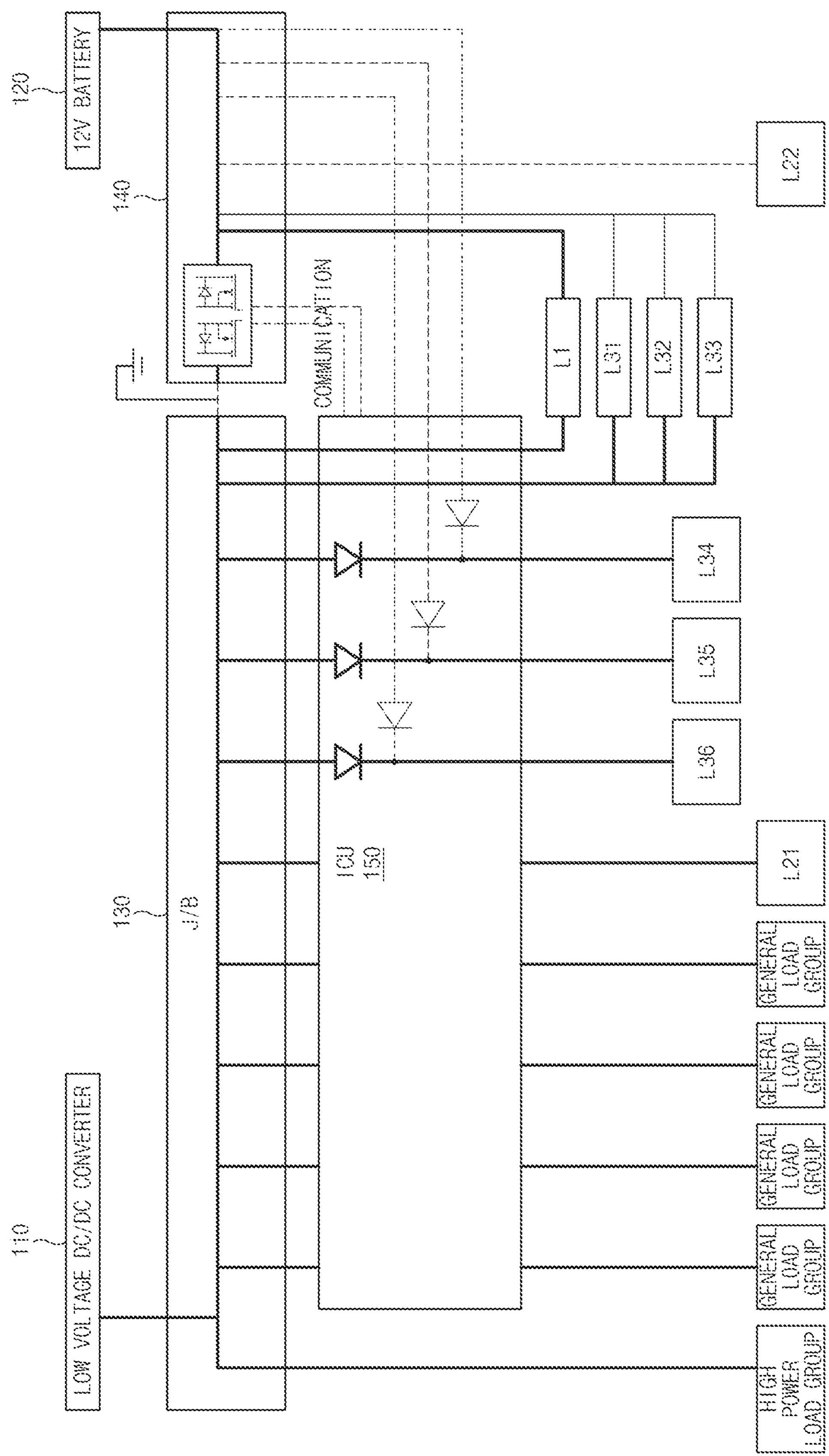
FIG. 10 shows an example of power control according to a third embodiment of the present disclosure.

FIG. 8 is a flowchart showing a power control method according to a third embodiment of the present disclosure. FIG. shows an example of power control according to a third embodiment of the present disclosure. FIG. 10 shows an example of power control according to a third embodiment of the present disclosure.

The first controller 140 may detect a main power failure (S400). The first controller 140 may monitor a current state of a main power input terminal using the current determination circuit 144, and determine that a main power failure occurs when a current input to a main power input terminal is an overcurrent of more than a reference current (e.g., 300 A). When the overcurrent is detected, the first controller 140 may immediately cut off the input of the main power using the current cut-off circuit 145.

The second controller 150 itself may diagnose (detect) a main power failure (S405). The second controller 150 may maintain a function of the second controller 150 by using auxiliary power supplied from the first controller 140 during a fuse melting time. The second controller 150 may determine a state of power input through a power input pin of the processor 146. For example, the second controller 150 may determine that the main power is normal and the auxiliary power is normal.

When the main power failure is detected, the first controller 140 may diagnose (re-identify) the main power failure again (S410). The first controller 140 may re-identify a Root Mean Square (RMS) of a current input to the main power input terminal for a predetermined time (e.g., 1 ms). When the re-identified current RMS is equal to or greater than a reference current, the first controller 140 may determine that the main power has failed.

Figure 9:
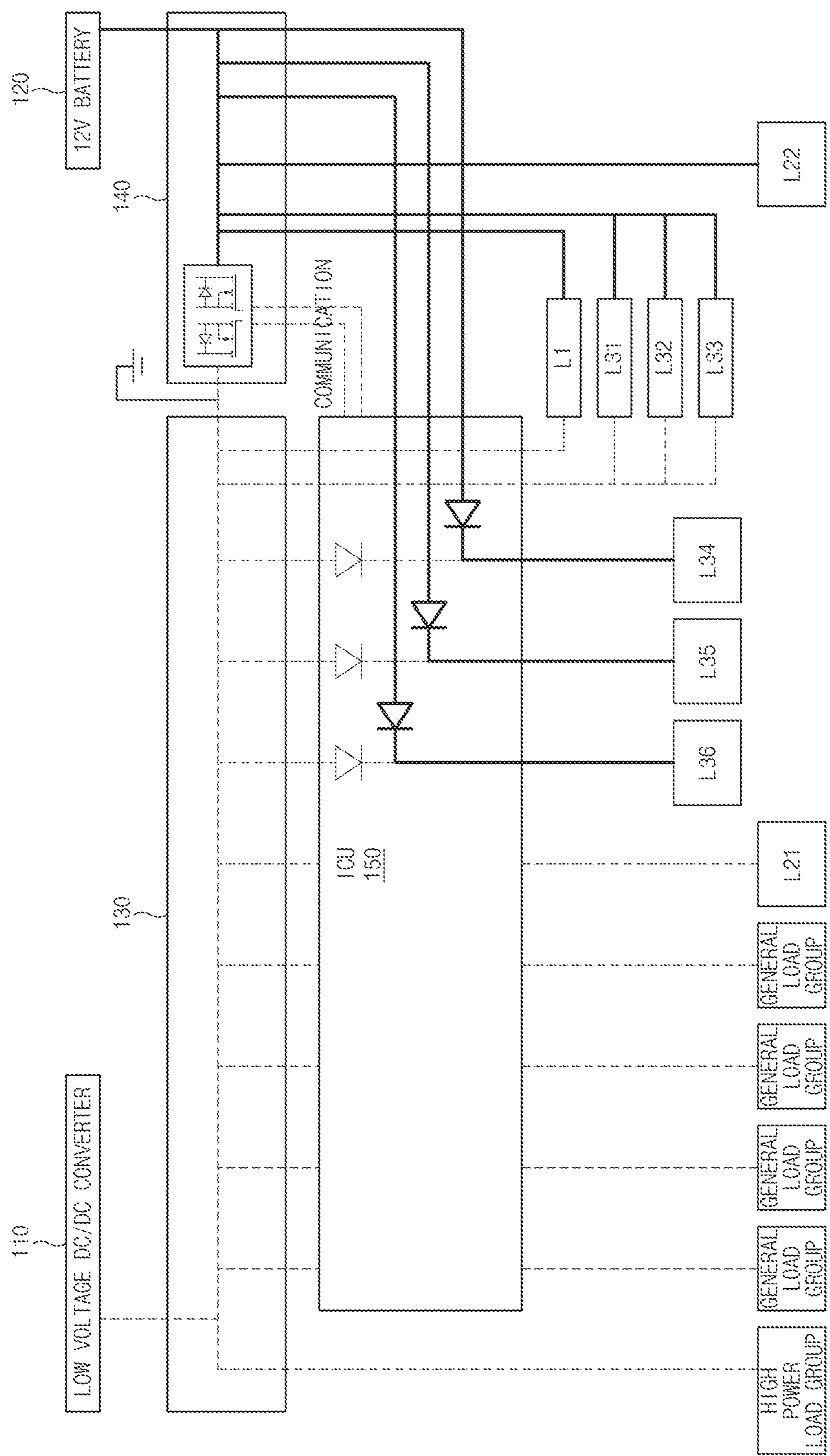
FIG. 9 shows an example of power control according to a third embodiment of the present disclosure.

The first controller 140 may transmit a main power failure diagnosis result to the second controller 150 (S420). When the main power failure is diagnosed, the first controller 140 may cut off the supply of the main power and maintain the supply of the auxiliary power, as shown in FIG. 9.

The second controller 150 may finally diagnose a main power output failure with respect to the first controller 140 by comparing the main power failure diagnosis result received from the first controller 140 with a result of failure diagnosis performed by itself (S430).

The second controller 150 may transmit the final diagnosis result to the first controller 140 (S435). The second controller 150 may transmit a message instructing to turn on a warning lamp notifying the main power output failure to a lighting device. The second controller 150 may periodically monitor a state of the auxiliary power.

The first controller 140 may determine a main power output failure based on a message transmitted from the second controller 150 (S440).

When the main power output failure is determined, the first controller 140 may supply power to the in-vehicle loads 160 connected to the first controller 140 by using the auxiliary power (S445).

When the main power output failure is determined, the second controller 150 may supply power to the in-vehicle loads 160 connected to the second controller 150 by using the auxiliary power (S450). Referring to FIG. 10, when a short circuit occurs between the power divider 130 and the first controller 140, the first controller 140 and the second controller 150 may supply power to the in-vehicle loads 160 in an independent manner. Therefore, in this case, all the loads operate normally, and the functions may be maintained until the auxiliary battery is discharged.

After a fuse is melted, the second controller 150 may monitor power input through a main power input pin to determine whether the main power is restored. When the restoration of the main power is determined, the second controller 150 may share a state of the main power through communication with the first controller 140.

Figure 11:
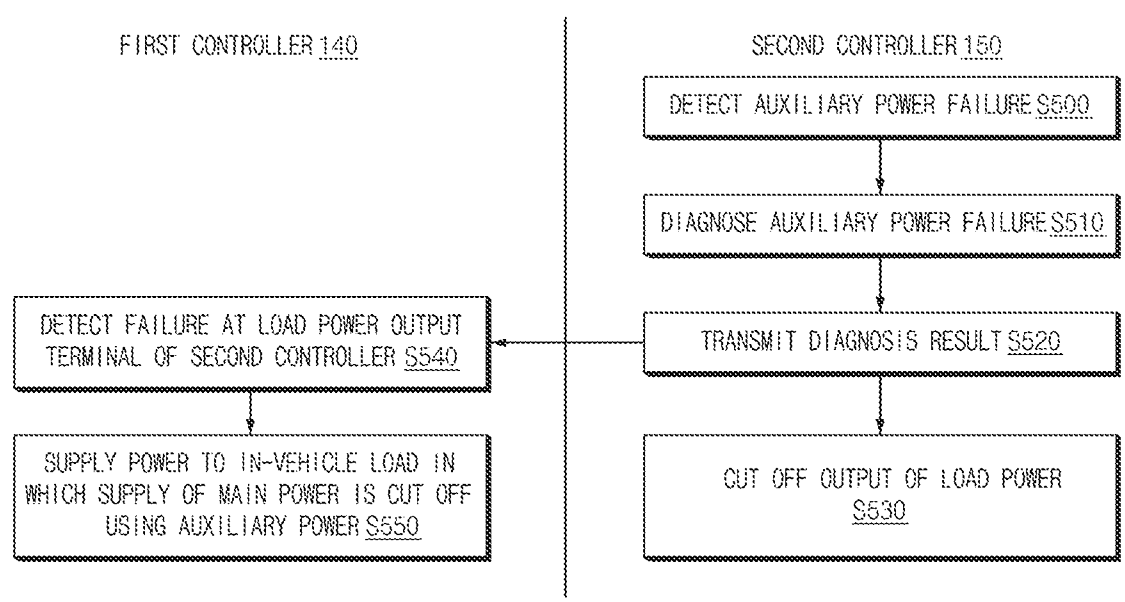
FIG. 11 is a flowchart showing a power control method according to a fourth embodiment of the present disclosure.

FIG. 11 is a flowchart showing a power control method according to a fourth embodiment of the present disclosure;

The second controller 150 may detect a load power failure (S500). The second controller 150 may monitor a current or voltage of a load power output terminal to determine whether a load power has failed. The second controller 150 may determine that a load power failure occurs when an overcurrent of more than twice a rated current occurs at the load power output terminal or a voltage fluctuation of the load power output terminal is out of a predetermined threshold range. The second controller 150 may cut off the load power in which a failure is detected.

The second controller 150 may diagnose a load power failure again (S510). The second controller 150 may re-identify whether the load power has failed through the average current value of the load power output terminal for a predetermined time. The second controller 150 may identify the in-vehicle load 160 in which a power failure has been detected.

The second controller 150 may transmit a failure diagnosis result to the first controller 140 (S520). The second controller 150 may transmit, to the first controller 140, a message containing a trouble code mapped to a failure location and a failure type (e.g., short circuit or low voltage).

The second controller 150 may cut off the load power in which the failure is detected (S530). The second controller 150 may cut off supply of main power to the in-vehicle load 160 connected to a load power output terminal. The second controller 150 may instruct a cluster device to turn on a warning lamp indicating a load power failure. In addition, the second controller 150 may monitor a power supply state to a power failure load of the first controller 140 through communication with the first controller 140.

The first controller 140 may detect a load power failure of the second controller 150 based on a failure diagnosis result transmitted from the second controller 150 (S540). When the first controller 140 receives a failure diagnosis result message transmitted from the second controller 150, the first controller 140 may recognize that a failure has occurred in a power output terminal to the in-vehicle load 160 connected to the second controller 150 based on the diagnosis result included in the received message.

The first controller 140 may supply power to the in-vehicle load 160 in which main power supply is cut off, using the auxiliary power (S550).

Figure 12:
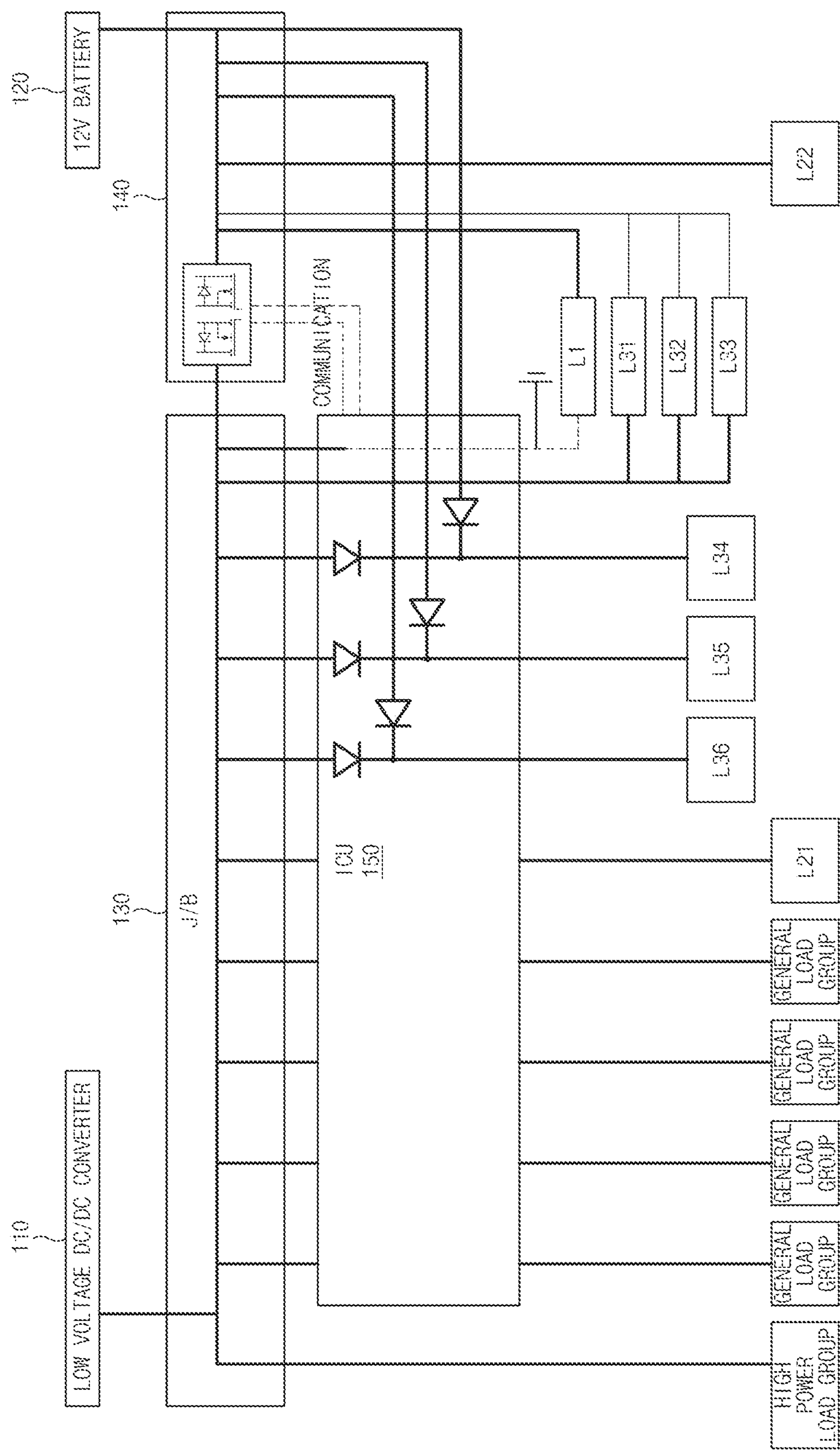
FIG. 12 shows an example of power control according to a fourth embodiment of the present disclosure.

FIG. 12 shows an example of power control according to a fourth embodiment of the present disclosure.

Referring to FIG. 12, when a short circuit occurs in a power line from the second controller 150 to the first load group L1 (e.g., MDPS), the second controller 150 may detect a power output failure to the first load group L1 through the current determination circuit 144. A processor in the second controller 150 may re-identify the power output failure of the first load group L1 by executing power failure determination logic. The second controller 150 may turn off a switch for controlling power supply and cut-off to the first load group L1. The second controller 150 may transmit a CAN message containing a trouble code indicating a power failure of the first load group L1 connected to the second controller 150 to the first controller 140. In this case, the second controller 150 may also transmit the CAN message containing the trouble code to a controller of the first load group L1.

The first controller 140 may detect a power failure of the first load group L1 connected to the second controller 150 through communication with the second controller 150. The first controller 140 may maintain power supply of 50% of rated power for the first load group L1 using the auxiliary power. The first controller 140 may monitor an operation state of the first load group L1 and periodically share monitoring information with the second controller 150.

Thereafter, the second controller 150 may supply 50% of the rated power for the first load group L1 by using the main power when it is identified that a warning lamp is turned off after an after service (AS). The second controller 150 may transmit a message notifying that power of the first load group L1 is restored to the first controller 140. The second controller 150 may monitor the power recovery state of the first load group L1, and when 'Power of the first load group L1 before failure=the current power of the first load group L1 of the first controller 140+current power of the first load group L1 of the second controller 150+allowable error [%]' is satisfied, transmit a message notifying completion of power recovery of the first load group L1 to the first controller 140. The second controller 150 may periodically monitor a state of the first load group L1.

When the message notifying power restoration of the first load group L1 is received from the second controller 150, the first controller 140 may cross check whether a voltage level of the first load group L1 has been restored to a state before a failure. The first controller 140 may transmit power information of the first load group L1 before failure and current power information of the first load group L1 to the second controller 150. When the message notifying completion of power restoration of the first load group L1 is received from the second controller 150, the first controller 140 may monitor the state of the first load group L1 and share monitoring information with the second controller 150.

Figure 13:
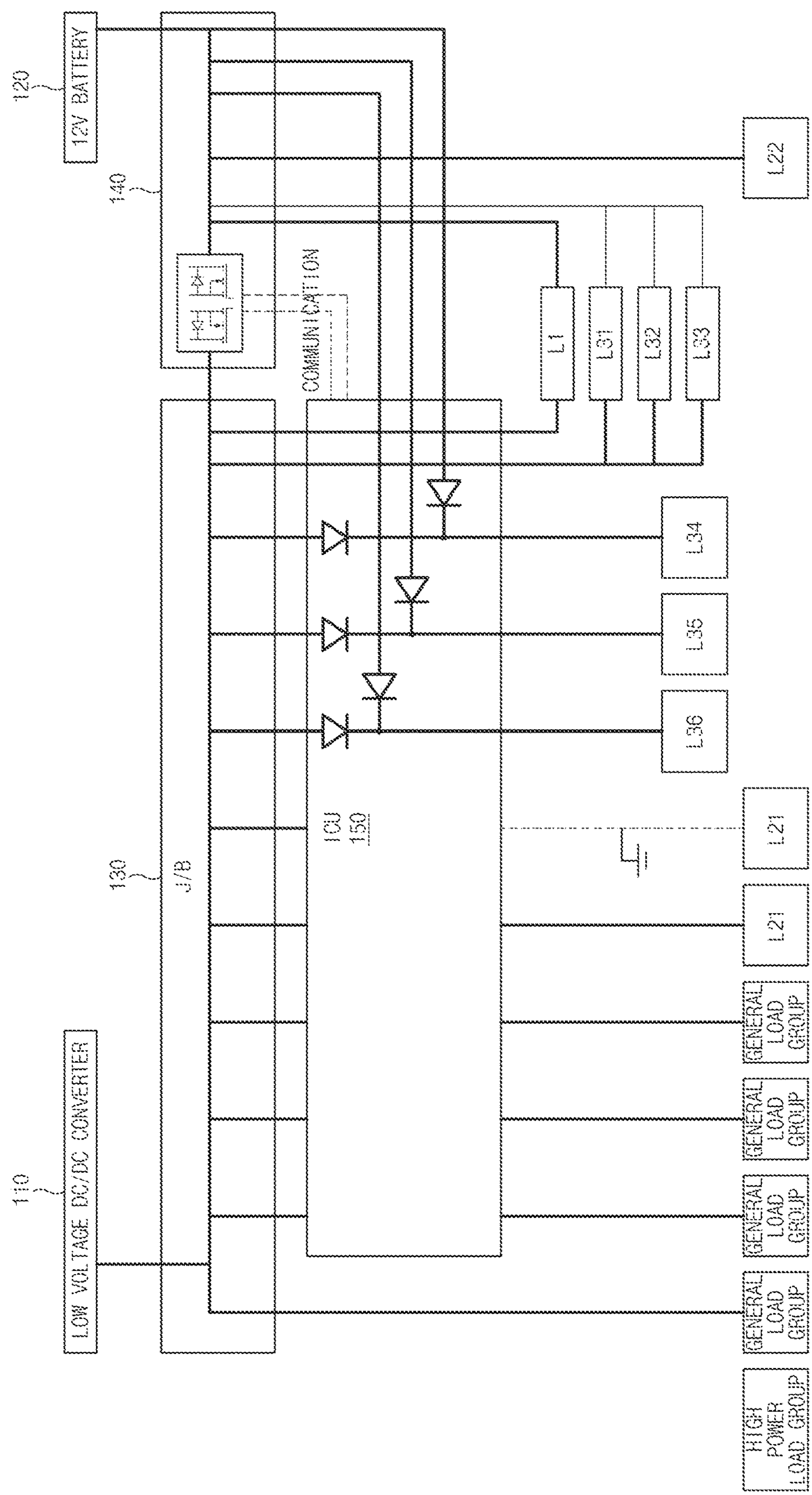
FIG. 13 shows an example of power control according to a fourth embodiment of the present disclosure.

FIG. 13 shows an example of power control according to a fourth embodiment of the present disclosure.

Referring to FIG. 13, when a short circuit occurs on a power output side to a second load group L21 (e.g., IEB) connected to the second controller 150, the second controller 150 may detect a power failure of the second load group L21 and cut off the power of the second load group L21. The second controller 150 may share the power failure of the second load group L21 with the first controller 140 using CAN communication. The second controller 150 may share the power failure of the second load group L21 with a controller of the second load group L22 (e.g., RCU and EPB) using CAN communication. The second controller 150 may instruct the cluster device to turn on a warning lamp indicating the power failure of the second load group L21.

The first controller 140 may detect the power failure of the second load group L21 through the second controller 150, supply power to the RCU of the second load group L22 using auxiliary power to control a front wheel hydraulic pressure, and control a rear wheel motor with a brake caliper by suppling power to the EPB of the second load group L22 to secure the braking capacity of front and rear wheels. The first controller 140 may monitor the operating states of the RCU and the EPB, and periodically transmit monitoring information to the second controller 150 for sharing.

The second controller 150 then may start supplying power to the second load group L21 using the main power when identifying that the warning lamp is turned off, and transmit a message notifying that the power of the second load group L21 is restored to the first controller 140. The second controller 150 may monitor the power recovery state of the second load group L21, and when 'Breaking power before failure=the current power (=power of the RCU and the EPB) of the second load group L22 of the first controller 140+current power of the second load group L21 of the second controller 150+allowable error [%]' is satisfied, transmit a message notifying completion of power restoration of the second load group L21 to the first controller 140. The second controller 150 may periodically monitor a state of the second load group L21.

When the first controller 140 receives the message notifying the completion of the second load group L21 from the second controller 150, the first controller 140 may adjust the power output of the second load group L22, and cross-check whether the power of the second load group L21 has been restored to a state before failure. The first controller 140 may transmit power information of the second load group L21 before failure and current power information of the second load group L22 to the second controller 150. When the message notifying completion of power restoration of the second load group L21 is received from the second controller 150, the first controller 140 may monitor an operation state of the second load group L22 and share monitoring information with the second controller 150.

Figure 14:
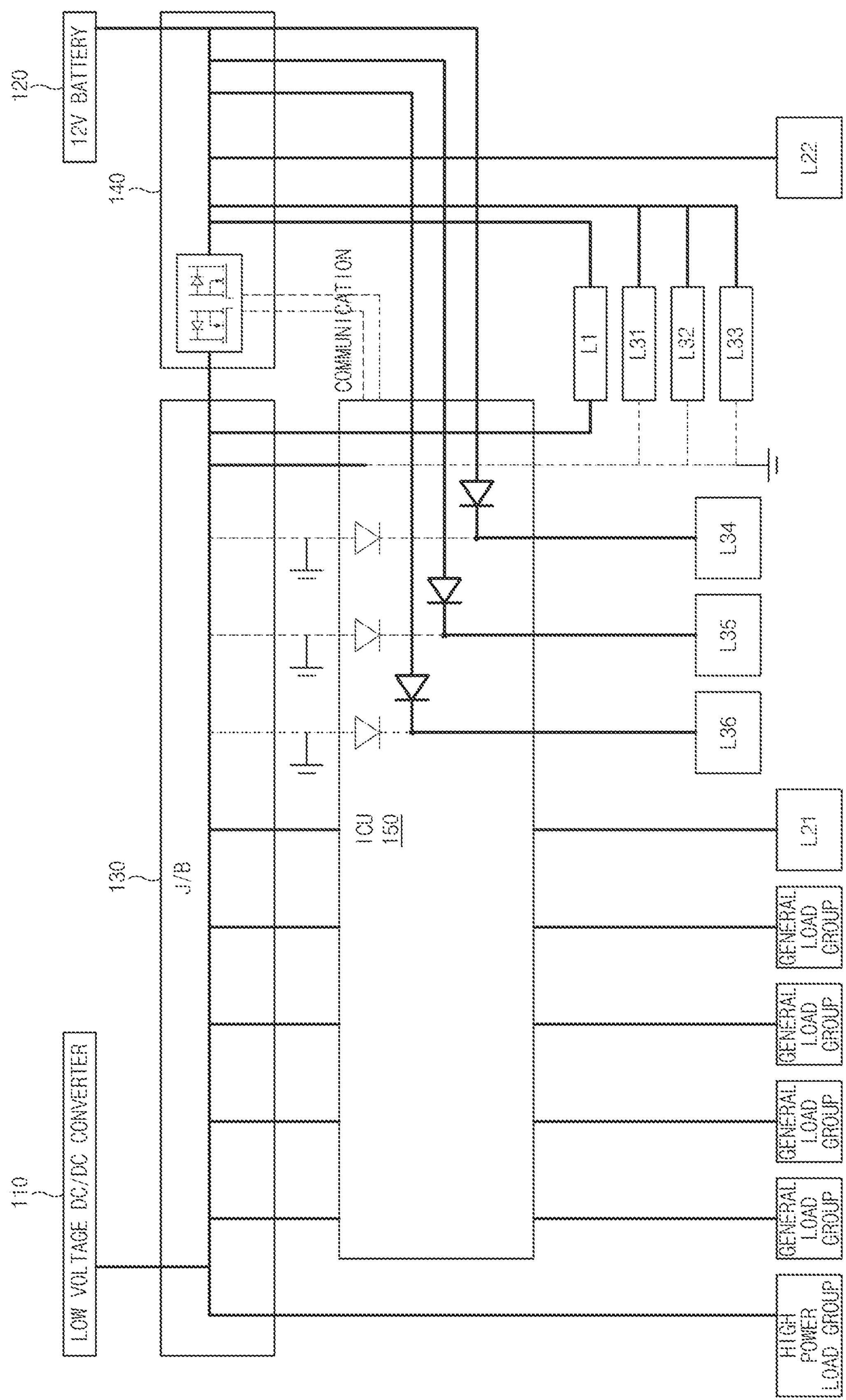
FIG. 14 shows an example of power control according to a fourth embodiment of the present disclosure.

FIG. 14 shows an example of power control according to a fourth embodiment of the present disclosure.

Referring to FIG. 14, when at least one of the third load groups L31 to L33 connected to the second controller 150 has a power failure, the second controller 150 may detect the power failure of the corresponding loads L31 to L33 and cut off power supply to the loads L31 to L33 in which the power failure has occurred. The second controller 150 may share the load power in which a power failure is detected with the first controller 140.

The first controller 140 may supply power to the loads L31 to L33 in which a power failure is detected using the auxiliary power. The first controller 140 may monitor the operation states of the loads L31 to L33 and periodically transmit the operation states to the second controller 150.

The second controller 150 then may detect restoration of the load power and share the restoration of the load power with the first controller 140. The first controller 140 may adjust the power output to a corresponding load when it is identified that the load power of the second controller 150 is restored.

Figure 15:
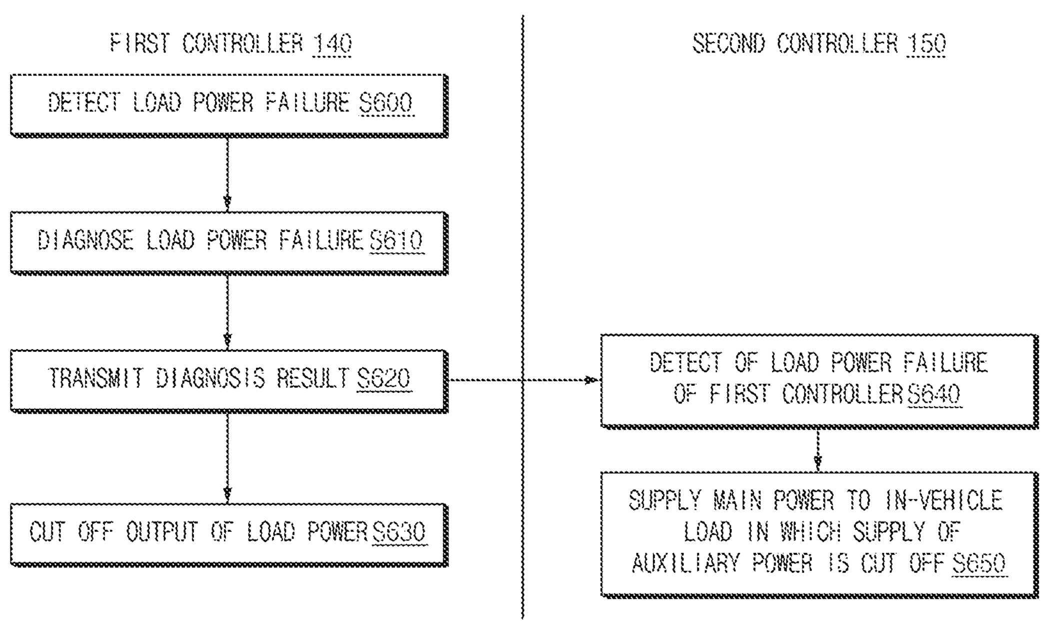
FIG. 15 is a flowchart showing a power control method according to a fifth embodiment of the present disclosure.

FIG. 15 is a flowchart showing a power control method according to a fifth embodiment of the present disclosure.

Referring to FIG. 15, the first controller 140 may detect a load power failure (S600). The first controller 140 may monitor the output of the load power of the first controller 140 to identify an overcurrent of more than twice the rated power or voltage fluctuation.

The first controller 140 may diagnose a load power failure again (S610). When the load power failure is detected, the first controller 140 may re-identify whether the load power failure has occurred based on an average current value of a corresponding load power output terminal for a predetermined time.

The first controller 140 may transmit a failure diagnosis result of the load power to the second controller 150 (S620). The first controller 140 may transmit a CAN message containing a trouble code corresponding to the load power failure which has occurred, to the second controller 150.

The first controller 140 may cut off the load power output (S630). The first controller 140 may cut off the supply of auxiliary power to a load in which a power failure has occurred by using the current cut-off circuit 145.

The second controller 150 may detect a load power failure of the first controller 140 (S640). The second controller 150 may detect a load power failure of the first controller 140 based on a trouble code contained in a message received from the first controller 140.

The second controller 150 may supply power by using the main power to the in-vehicle load 160 in which supply of the auxiliary power is cut off by the first controller 140 (S640). The second controller 150 may supply power to a corresponding load in which a load power failure of the first controller 140 occurs by using the main power.

Figure 16:
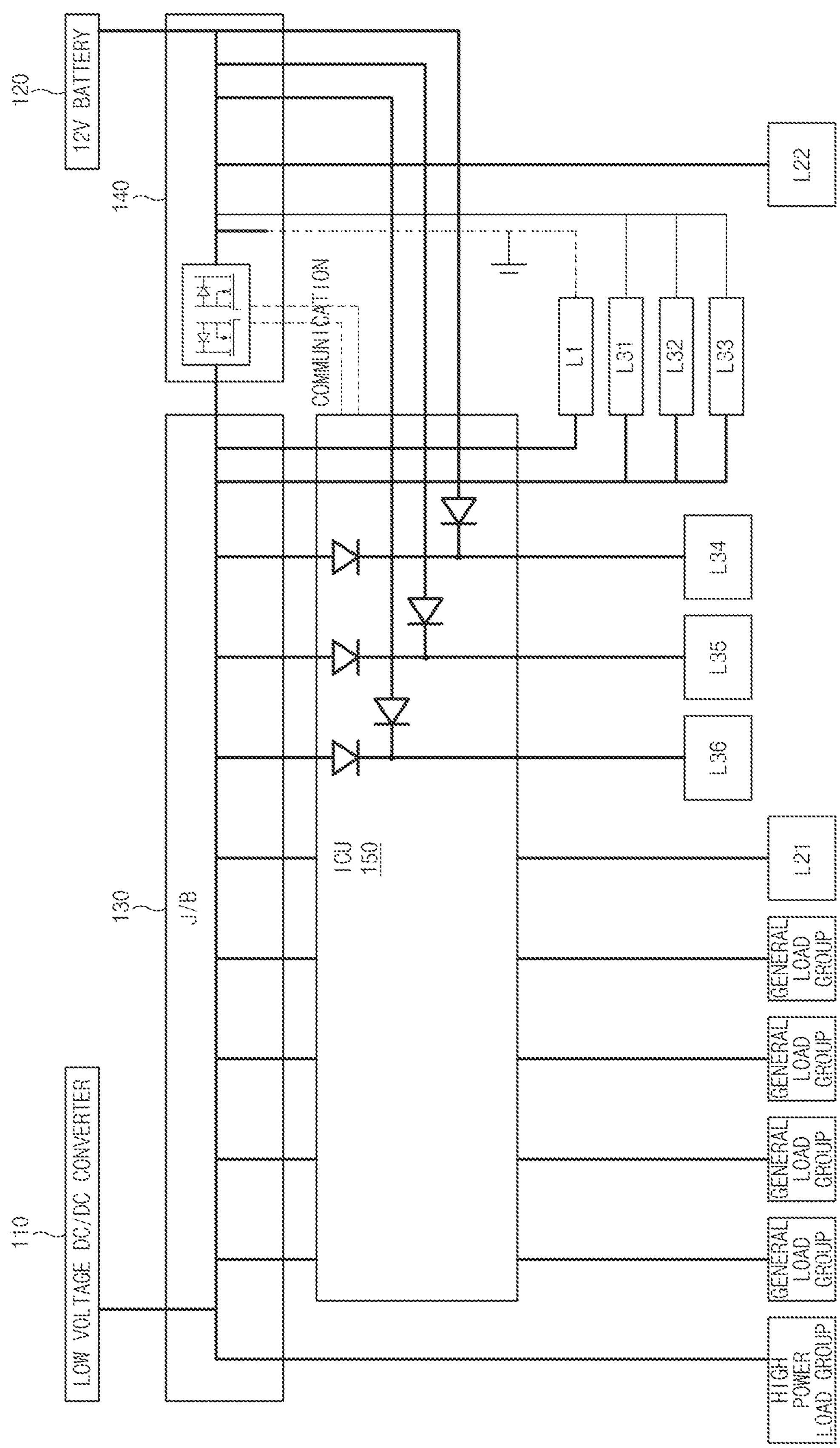
FIG. 16 shows an example of power control according to a fifth embodiment of the present disclosure.

FIG. 16 shows an example of power control according to a fifth embodiment of the present disclosure.

Referring to FIG. 16, when a failure (e.g., short circuit) occurs in the first load group L1 of the first controller 140, for example, an MDPS power supply line, the first controller 140 may notify the power failure of the first load group L1 to the second controller 150 and disconnect the first load group L1 from the first controller 140.

The second controller 150 may detect a power failure of the first load group L1 of the first controller 140 through communication with the first controller 140. The second controller 150 may notify a controller of the first load group L1 of the power failure of the first load group L1 of the first controller 140.

The second controller 150 may maintain power supply of 50% of the rated power of the first load group L1 by using the main power. The second controller 150 may monitor an operation state of the first load group L1 and output a power failure of the first load group L1 of the first controller 140 in a form which a user is able to recognize.

When the power of the first load group L1 is restored, the first controller 140 may transmit a message notifying start to restore the power of the first load group L1 to the second controller 150. The first controller 140 may monitor a power restoration state of the first load group L1 and periodically transmit monitoring information to the second controller 150. When a message notifying completion of the power restoration of the first load group L1 is received from the second controller 150, the first controller 140 may monitor an operation state of the first load group L1 and share the operation state with the second controller 150.

The second controller 150 may monitor the power recovery state of the first load group L1, and when 'Power of the first load group L1 before failure=the current power of the first load group L1 of the first controller 140+current power of the first load group L1 of the second controller 150+ allowable error [%]' is satisfied, transmit a message notifying completion of power recovery of the first load group L1 to the first controller 140. The second controller 150 may periodically monitor a state of the first load group L1.

Figure 17:
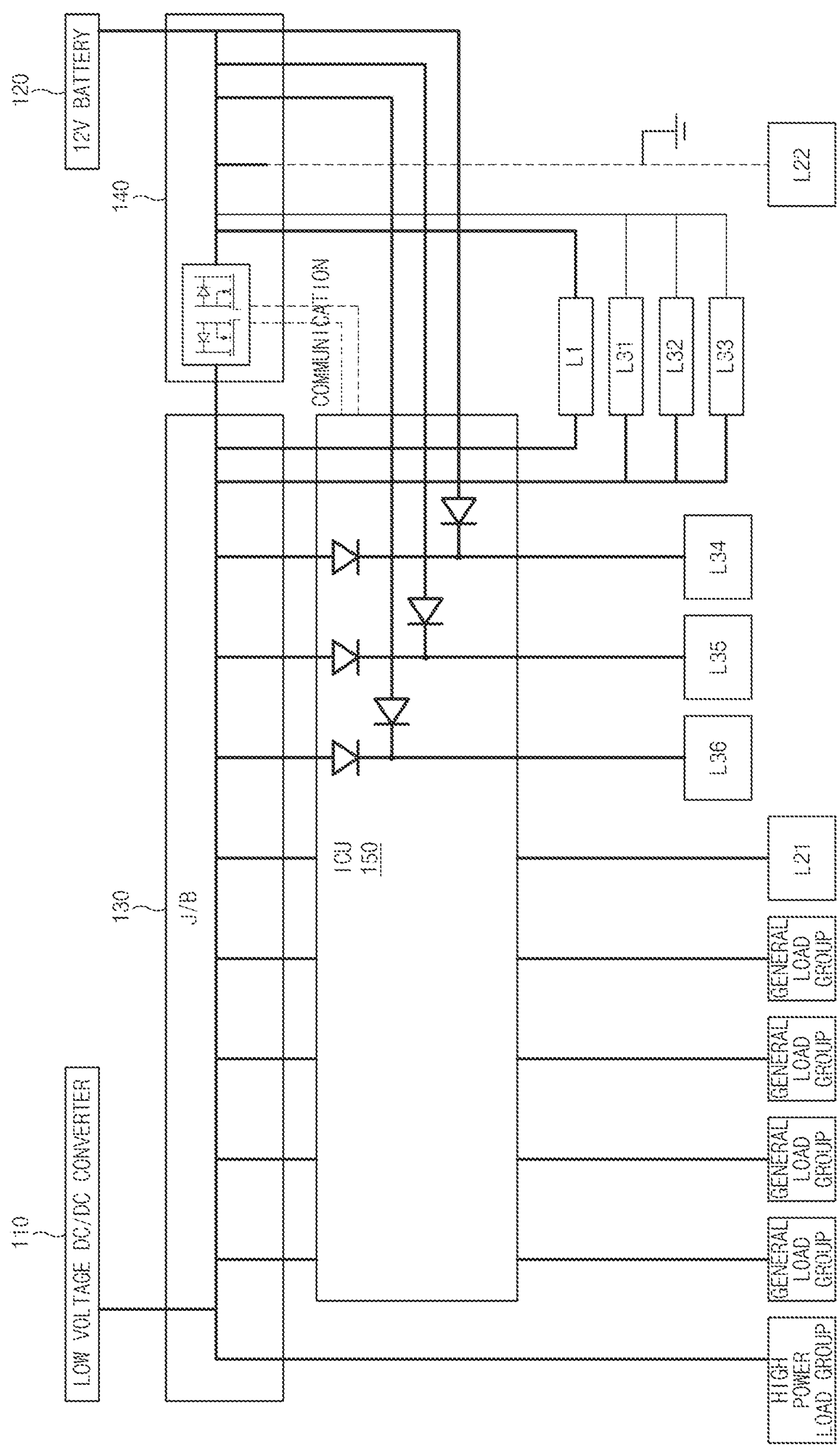
FIG. 17 shows an example of power control according to a fifth embodiment of the present disclosure.

FIG. 17 shows an example of power control according to a fifth embodiment of the present disclosure.

Referring to FIG. 17, when a power failure of the second load group L22 (e.g., RCU and EPB) occurs, the first controller 140 may detect a power failure of the second load group L22 by monitoring a braking power output. When the power failure of the second load group L22 is detected, the first controller 140 may immediately cut off the power of the second load group L22. The first controller 140 may transmit a message containing a trouble code indicating a power failure of the second load group L22 to the second controller 150.

The second controller 150 may detect a power failure of the second load group L22 of the first controller 140 based on a trouble code contained in a message received from the first controller 140. The second controller 150 may notify a power supply failure state to a controller of the second load group L22.

The second controller 150 may maintain the supply of 100% of the IEB power to enable the IEB to perform front and rear wheel hydraulic brake control. The second controller 150 may monitor a braking operation state of the IEB.

When the first controller 140 identifies the power restoration of the RCU and EPB through the second controller 150, the first controller 140 may supply power to the second load group L22 using the auxiliary power. The first controller 140 may monitor a power restoration state of the second load group L22 and periodically transmit monitoring information to the second controller 150.

The second controller 150 may transmit a message notifying the power restoration of the second load group L22 to the first controller 140 when the warning lamp indicating the power failure of the second load group L22 is turned off. The second controller 150 may transmit a message notifying completion of power restoration of the second load group L22 to the first controller 140 when 'Breaking power before failure=the current power (=breaking power) of the second load group L22 of the first controller 140+current power of the second load group L21 of the second controller 150+ allowable error [%]' is satisfied. The second controller 150 may periodically monitor states of all the braking loads L21 and L22, such as IEB, RCU and EPB.

Figure 18:
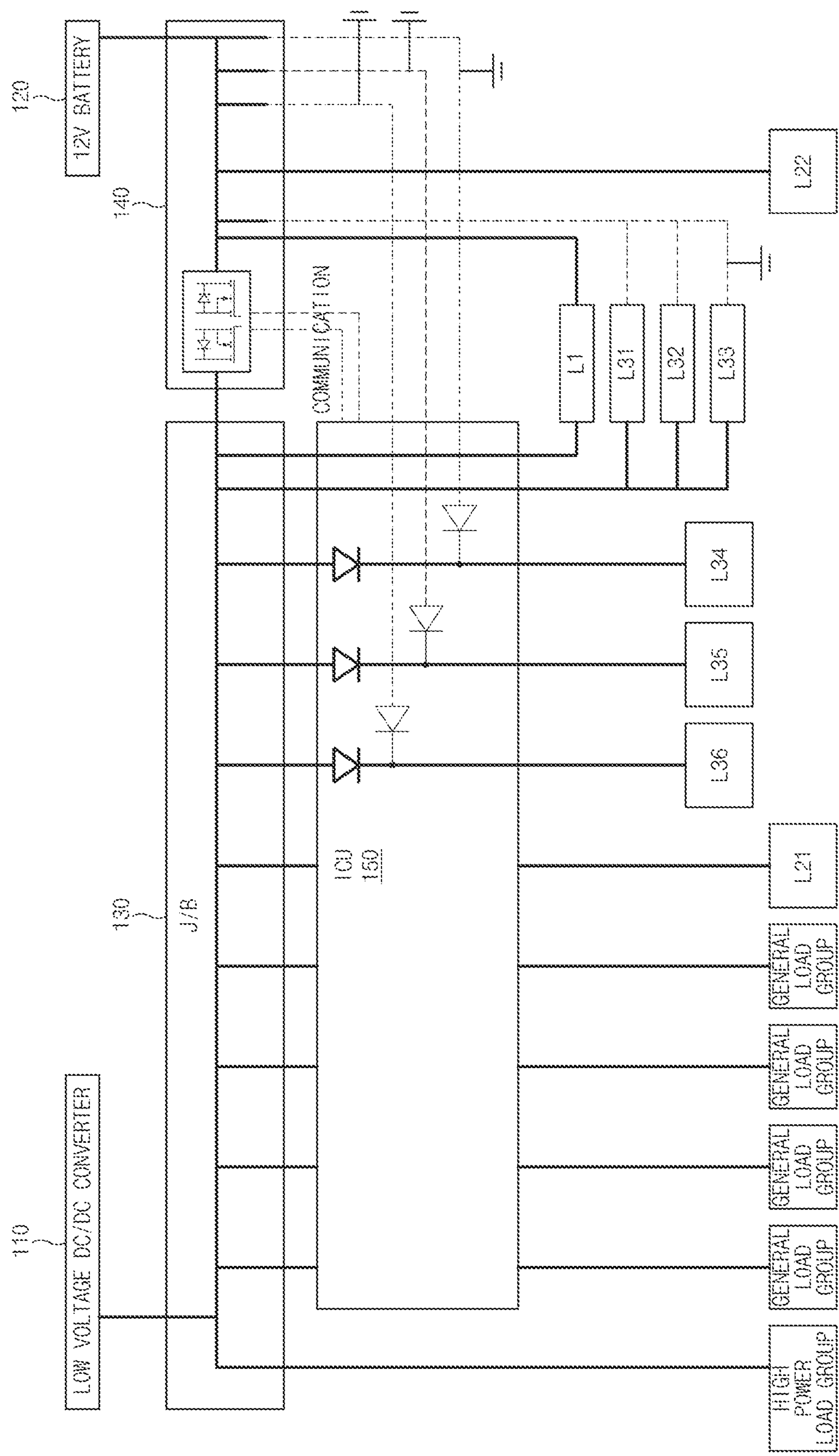
FIG. 18 shows an example of power control according to a fifth embodiment of the present disclosure.

FIG. 18 shows an example of power control according to a fifth embodiment of the present disclosure.

Referring to FIG. 18, when at least one of the third load groups L31 to L36 connected to the first controller 140 has a power failure, the first controller 140 may detect the power failure and cut off power supply to a load in which the power failure has occurred. The first controller 140 may share the load power in which a power failure is detected with the second controller 150.

The second controller 150 may supply power to a load in which a power failure is detected using the main power. The second controller 150 may monitor an operation state of the corresponding load.

The second controller 150 may detect restoration of the load power and share the restoration of the load power with the first controller 140. The first controller 140 may adjust the power output to a corresponding load when it is identified that the load power of the second controller 150 is restored.

Figure 19:
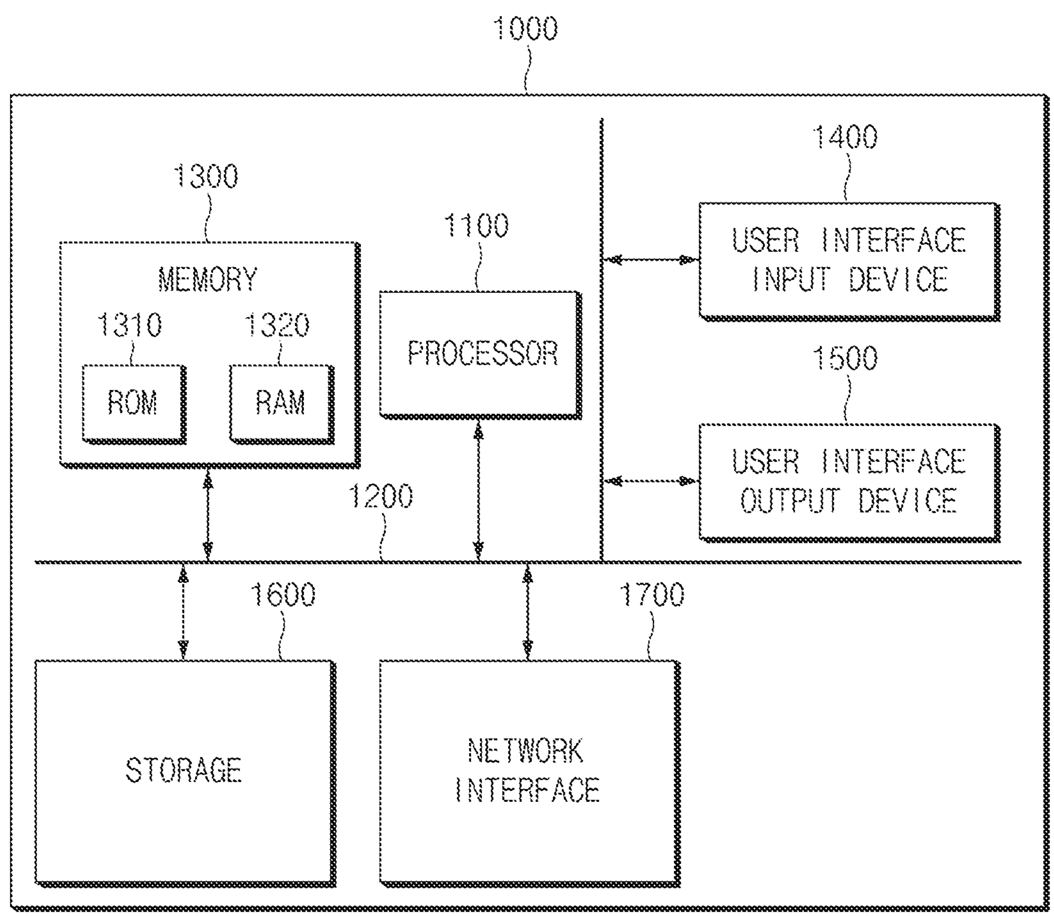
FIG. 19 is a block diagram of a computing system for executing a power control method according to embodiments of the present disclosure.

FIG. 19 is a block diagram of a computing system for executing a power control method according to embodiments of the present disclosure.

Referring to FIG. 19, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains. Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

According to the present disclosure, it is possible to implement a power redundancy system capable of stably supplying power to a main load for autonomous driving in case of a power failure during autonomous driving.

Further, according to the present disclosure, it is possible to secure redundant power without adding a low voltage dc/dc converter and/or a battery.

In addition, according to the present disclosure, it is possible to immediately cut off and disconnect a faulty part when a power failure occurs during autonomous driving, thereby ensuring voltage stability of the redundant power.

In addition, according to the present disclosure, it is possible to configure a power switch based on a semiconductor and shorten a power stabilization time by reducing a failure cut-off time compared to a fuse.

In addition, according to the present disclosure, physical redundancy is implemented through power disconnection and functional redundancy for the main load of autonomous driving is implemented, thereby enabling fail safe response to power-net failure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A power control apparatus comprising:

a first power supply device configured to supply main power;

a second power supply device configured to supply auxiliary power;

a power divider connected to the first power supply device and configured to divide the main power supplied from the first power supply device;

a first controller connected to a first output terminal of the power divider to control power supply to in-vehicle loads by connecting or disconnecting the main power and the auxiliary power; and a second controller connected to a second output terminal of the power divider to control power supply to the in-vehicle loads using the main power, wherein the first controller and the second controller diagnose a power failure in cooperation with each other and supply redundancy power selectively using the main power and the auxiliary power based on a power failure diagnosis result, and wherein the second controller diagnoses the power failure based on at least one of a main power input state of the second controller, the main power input state of the first controller, whether it is possible to supply load power of the second controller, or any combination thereof in response that the first controller detects a main power failure of the first controller.

2. The power control apparatus of claim 1, wherein the first power supply device includes a low voltage dc/dc converter configured to convert high voltage power supplied from a high voltage battery to low voltage power, and wherein the second power supply device includes an auxiliary battery configured to supply the low voltage power.

3. The power control apparatus of claim 1, wherein the first controller includes:

a communication circuit configured to perform communication with the second controller;

a first switch configured to:

monitor the main power and the auxiliary power between the first power supply device and the second power supply device; and supply or cut off at least one of the main power or the auxiliary power according to a monitoring result;

a second switch configured to supply or cut off power to the in-vehicle loads; and a processor configured to:

diagnose a power failure in cooperation with the first controller; and control at least one of the first switch or the second switch based on a diagnosis result.

4. The power control apparatus of claim 3, wherein the first controller further includes:

a current determination circuit configured to detect at least one overcurrent in at least one of a main power input terminal, an auxiliary power input terminal or a load power output terminal; and a current cut-off circuit configured to cut off an overcurrent-detected portion when the at least one overcurrent is detected.

5. The power control apparatus of claim 1, wherein the first controller is configured to:

disconnect and cut off the main power from the first controller when the main power failure is detected, and supply power to the in-vehicle loads using the auxiliary power when identifying a main power output failure of the first power supply device in cooperation with the second controller.

6. The power control apparatus of claim 1, wherein the first controller is configured to transmit a message notifying a power failure to the second controller when identifying a main power output failure of the power divider, and wherein the second controller is configured to supply power to the in-vehicle loads using the main power in an independent manner from the first controller.

7. The power control apparatus of claim 1, wherein the first controller is configured to monitor a state of a current input from the second power supply device, and wherein, when an auxiliary power failure is detected, the first controller cuts off the auxiliary power to maintain the main power supply.

8. The power control apparatus of claim 1, wherein, when a power output failure of the first controller to at least one of the in-vehicle loads is detected, the second controller is configured to supply power to the at least one of the in-vehicle loads in which the power output failure of the first controller is detected using the main power.

9. The power control apparatus of claim 1, wherein, when a power output failure of the second controller to at least one of the in-vehicle loads is detected, the first controller is configured to supply power to the at least one of the in-vehicle loads in which the power output failure of the second controller is detected using the auxiliary power.

10. The power control apparatus of claim 1, wherein each of the in-vehicle loads includes at least one of a steering device, a braking device, an autonomous driving device, an airbag device, a cluster device, a lighting device, a door device, or a communication device.

11. A power control method comprising:

diagnosing, by a first controller and a second controller in cooperation with each other, a power failure; and suppling, by the first controller and the second controller, redundancy power to in-vehicle loads, respectively, selectively using main power from a first power supply device and auxiliary power from a second power supply device based on a power failure diagnosis result, wherein the diagnosing of the power failure includes diagnosing, by the second controller, the power failure based on at least one of a main power input state of the second controller, the main power input state of the first controller, whether it is possible to supply load power of the second controller, or any combination thereof in response that the first controller detects a main power failure of the first controller.

12. The power control method of claim 11, wherein the diagnosing of the power failure includes:

monitoring, by the first controller, a state of the main power and a state of the auxiliary power outputted from the first power supply device and the second power supply device, respectively;

determining, by the first controller, whether the power failure is present on a main power input side or an auxiliary power input side in response to detecting the power failure;

upon determining that the power failure is present on the auxiliary power input side, determining, by the first controller, an auxiliary power input failure; and upon determining that the power failure is not present, determining, by the first controller, a load power output failure of the first controller.

13. The power control method of claim 12, wherein the supplying of the redundancy power includes:

cutting off, by the first controller, an input of the auxiliary power upon determining the auxiliary power input failure; and maintaining, by the second controller, supply of power to the in-vehicle loads using the main power upon detecting the auxiliary power input failure through the first controller.

14. The power control method of claim 12, wherein the supplying of the redundancy power includes:

cutting off, by the first controller, a load power output using the auxiliary power upon determining the load power output failure of the first controller; and in response to detecting the load power output failure of the first controller through the first controller, supplying, by the second controller, power to at least one of the in-vehicle loads to which power supply by the first controller is cut off using the main power.

15. The power control method of claim 12, wherein the diagnosing of the power failure includes:

when the main power failure of the first controller is detected by the first controller, determining, by the second controller, the main power input failure based on a main power input state of the second controller;

when the main power input failure is not detected, determining, by the second controller, a first controller power output failure of a power divider arranged between the first power supply device and the first controller based on the main power input state of the first controller by communicating with the first controller;

when the main power input of the first controller is normal, determining, by the second controller, a load power output failure of the second controller based on whether it is possible to supply load power of the second controller; and upon determining that it is possible to supply the load power, determining, by the second controller, a high current load power output failure of the power divider.

16. The power control method of claim 15, wherein the supplying of the redundancy power includes:

upon determining the main power input failure, cutting off, by the second controller, the main power input; and supplying, by the first controller, power to the in-vehicle loads using the auxiliary power.

17. The power control method of claim 15, wherein the supplying of the redundancy power includes:

cutting off, by the first controller, the main power input in response to determining a power output failure of the power divider to the first controller; and supplying, by the first controller and the second controller, power to the in-vehicle loads in an independent manner.

18. The power control method of claim 15, wherein the supplying of the redundancy power includes:

upon determining the load power output failure of the second controller, cutting off, by the second controller, power supply to at least one of the in-vehicle loads; and supplying, by the first controller, power to the at least one of the in-vehicle loads in which the power supply by the second controller is cut off.

19. The power control method of claim 11, wherein the diagnosing of the power failure includes:

monitoring a current state of input power and output power of the first controller and the second controller; and immediately cutting off at least one of the input power or the output power in response to detecting an overcurrent.

20. The power control method of claim 11, wherein each of the in-vehicle loads includes at least one of a steering device, a braking device, an autonomous driving device, an airbag device, a cluster device, a lighting device, a door device, or a communication device.

* * * * *